(12) United States Patent
Hadi

(10) Patent No.: US 11,042,651 B2
(45) Date of Patent: Jun. 22, 2021

(54) SYSTEM AND METHOD FOR SECURING ELECTRONIC DOCUMENT EXECUTION AND AUTHENTICATION

(71) Applicant: Entrust & Title (FZE), Sharjah (AE)

(72) Inventor: Shamsh S. Hadi, Stone Mountain, GA (US)

(73) Assignee: Entrust & Title (FZE), Sharjah (AE)

( * ) Notice: Subject to any disclaimer, the term of this patent is extended or adjusted under 35 U.S.C. 154(b) by 97 days.

(21) Appl. No.: 16/400,953

(22) Filed: May 1, 2019

(65) Prior Publication Data
US 2019/0340369 A1 Nov. 7, 2019

Related U.S. Application Data

(60) Provisional application No. 62/666,339, filed on May 3, 2018.

(51) Int. Cl.
*G06F 21/60* (2013.01)
*G06K 9/00* (2006.01)
(Continued)

(52) U.S. Cl.
CPC ......... *G06F 21/602* (2013.01); *G06F 40/117* (2020.01); *G06K 9/00161* (2013.01); *H04L 9/0637* (2013.01); *H04L 9/0866* (2013.01)

(58) Field of Classification Search
CPC . G06F 21/602; G06F 40/117; G06K 9/00161; H04L 9/0637; H04L 9/0866
See application file for complete search history.

(56) References Cited

U.S. PATENT DOCUMENTS 9,559,847 B2 * 1/2017 Hurst ................... G06Q 10/109
9,613,190 B2 * 4/2017 Ford ....................... G06F 21/62
(Continued)

FOREIGN PATENT DOCUMENTS

WO 2011/005869 A2 1/2011

OTHER PUBLICATIONS

Notification of Transmittal of the International Search Report and the Written Opinion of the International Searching Authority, dated Nov. 28, 2019, issued in corresponding International Application No. PCT/IB2019/000612, 12 pages.

*Primary Examiner* — Joseph P Hirl
*Assistant Examiner* — Stephen T Gundry
(74) *Attorney, Agent, or Firm* — Foley & Lardner LLP

(57) ABSTRACT

The present embodiments provide an environment where a user first creates or imports a document comprising of fields to be completed by one or more users. All users who have view-only access or can act on a document are considered to be "in the workflow." All users in the workflow (except view-only users) can take actions in the document by editing, adding or entering values or signatures in those fields. When the document is complete, a computing device adds an encrypted token visualization element to the document that uniquely identifies and secures the document. Thereafter, a copy of the original document, all attachments, authentication, security and validation information, and all other relevant information about the document and users will be available to view in the chain of custody and audit trail by the authorized users by scanning the token visualization element within the platform (web application or mobile application).

20 Claims, 24 Drawing Sheets

(51) Int. Cl.
    *H04L 9/06* (2006.01)
    *H04L 9/08* (2006.01)
    *G06F 40/117* (2020.01)

(56) References Cited

U.S. PATENT DOCUMENTS

| | | | | |
|---|---|---|---|---|
| 9,654,463 | B2* | 5/2017 | Brannon | G06F 21/335 |
| 9,760,697 | B1* | 9/2017 | Walker | G06F 21/645 |
| 9,923,904 | B1 | 3/2018 | Saylor et al. | |
| 10,108,811 | B1* | 10/2018 | Walker | G06F 21/645 |
| 10,361,871 | B2* | 7/2019 | Saxena | H04L 9/3236 |
| 2004/0139327 | A1* | 7/2004 | Brown | H04L 9/3297 |
| | | | | 713/176 |
| 2012/0086971 | A1* | 4/2012 | Bisbee | G06Q 30/00 |
| | | | | 358/1.14 |
| 2014/0032913 | A1* | 1/2014 | Tenenboym | H04L 9/3247 |
| | | | | 713/176 |
| 2015/0010216 | A1* | 1/2015 | Papastefanou | G06K 9/00154 |
| | | | | 382/120 |
| 2015/0067347 | A1 | 3/2015 | Dease et al. | |
| 2015/0310188 | A1* | 10/2015 | Ford | H04L 63/0428 |
| | | | | 726/28 |
| 2016/0196297 | A1 | 7/2016 | Almgren | |
| 2016/0255242 | A1 | 9/2016 | Osadchyy et al. | |
| 2017/0032112 | A1* | 2/2017 | Follis | G06F 21/602 |
| 2017/0041296 | A1* | 2/2017 | Ford | G06F 16/951 |
| 2017/0345394 | A1* | 11/2017 | Bansal | G06F 3/1454 |
| 2018/0006825 | A1* | 1/2018 | Saxena | H04L 9/3236 |
| 2018/0062852 | A1* | 3/2018 | Schmahmann | H04L 9/14 |
| 2018/0239959 | A1* | 8/2018 | Bui | G06F 40/103 |
| 2018/0276270 | A1* | 9/2018 | Bisbee | G06F 16/2379 |
| 2018/0336554 | A1* | 11/2018 | Trotter | H04L 63/0853 |
| 2019/0019184 | A1* | 1/2019 | Lacey | G06Q 20/4016 |
| 2019/0121846 | A1* | 4/2019 | Kim | G06F 40/174 |
| 2019/0319948 | A1* | 10/2019 | Triola | H04L 9/3218 |
| 2020/0258176 | A1* | 8/2020 | Gibson | H04L 9/3239 |

* cited by examiner

Step 201 – Prepare document: Document is imported, along with any attachment required to be part of the workflow and then marked up to be sent to execute / sign by one or more people including the initiator. Workflow gets built here.

Step 202 – Send document: Workflow is started when the prepared document is sent to all parties (in pre-defined sequence) for them to execute. Execute means sign, date, initial, check box, fill out one or more fields in one or more forms. Parties may attach one or more supporting documents by uploading them when its their turn to execute the document.

Step 203 – Apply Token: Once all parties sign the last step of the workflow is where the token is applied to the document.

Step 204 – View Document: Once document is completed (signed by all parties) and the token is applied, the document is shared with all the parties in the workflow any time.

Step 205 – Share document externally Parties in the workflow may also share a completed document with individuals external to the workflow or with those who are not users.

Step 206 – Person authenticates Document: Person with whom a completed document is shared then authenticates the document by scanning the token visualization.

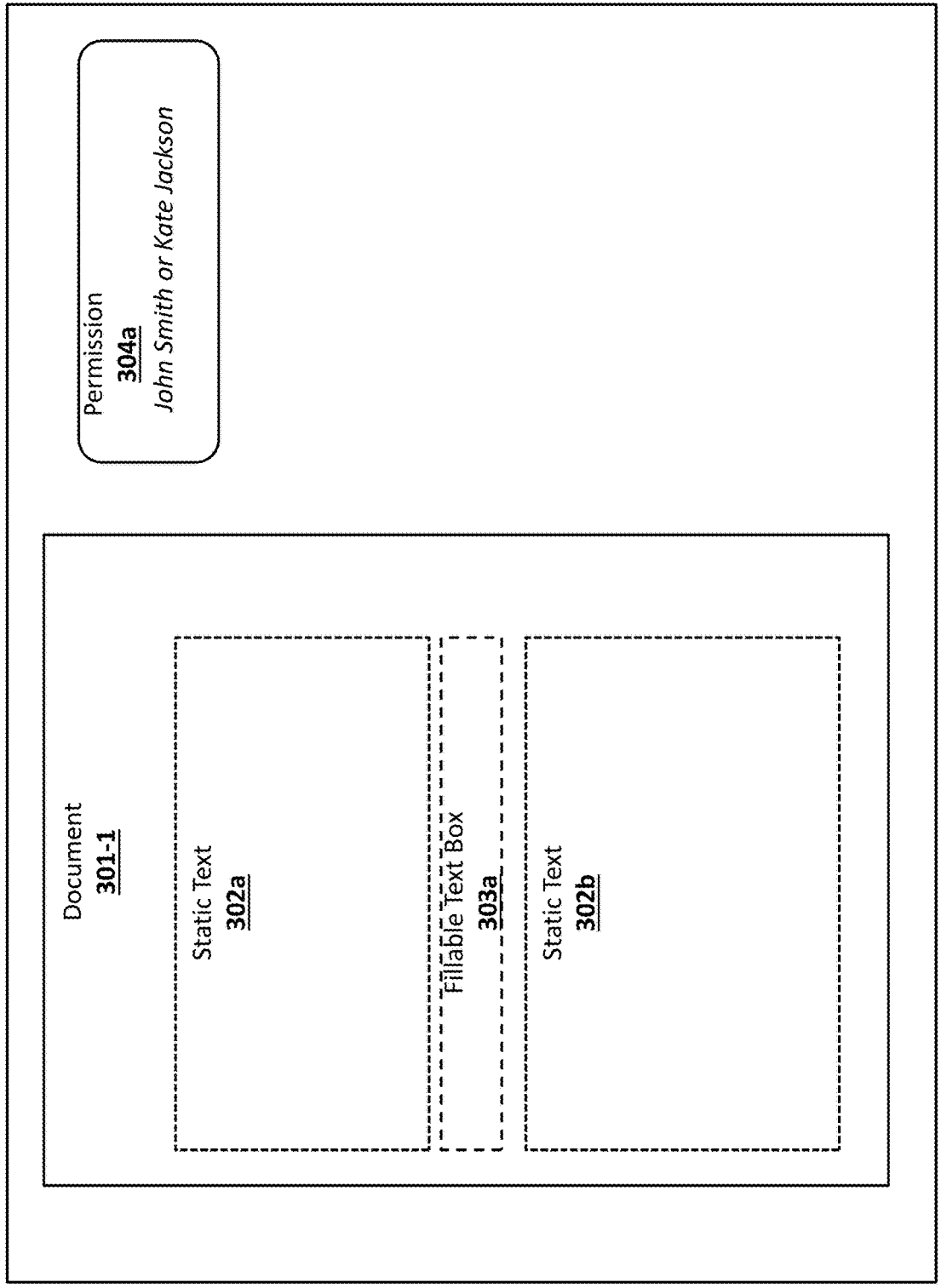

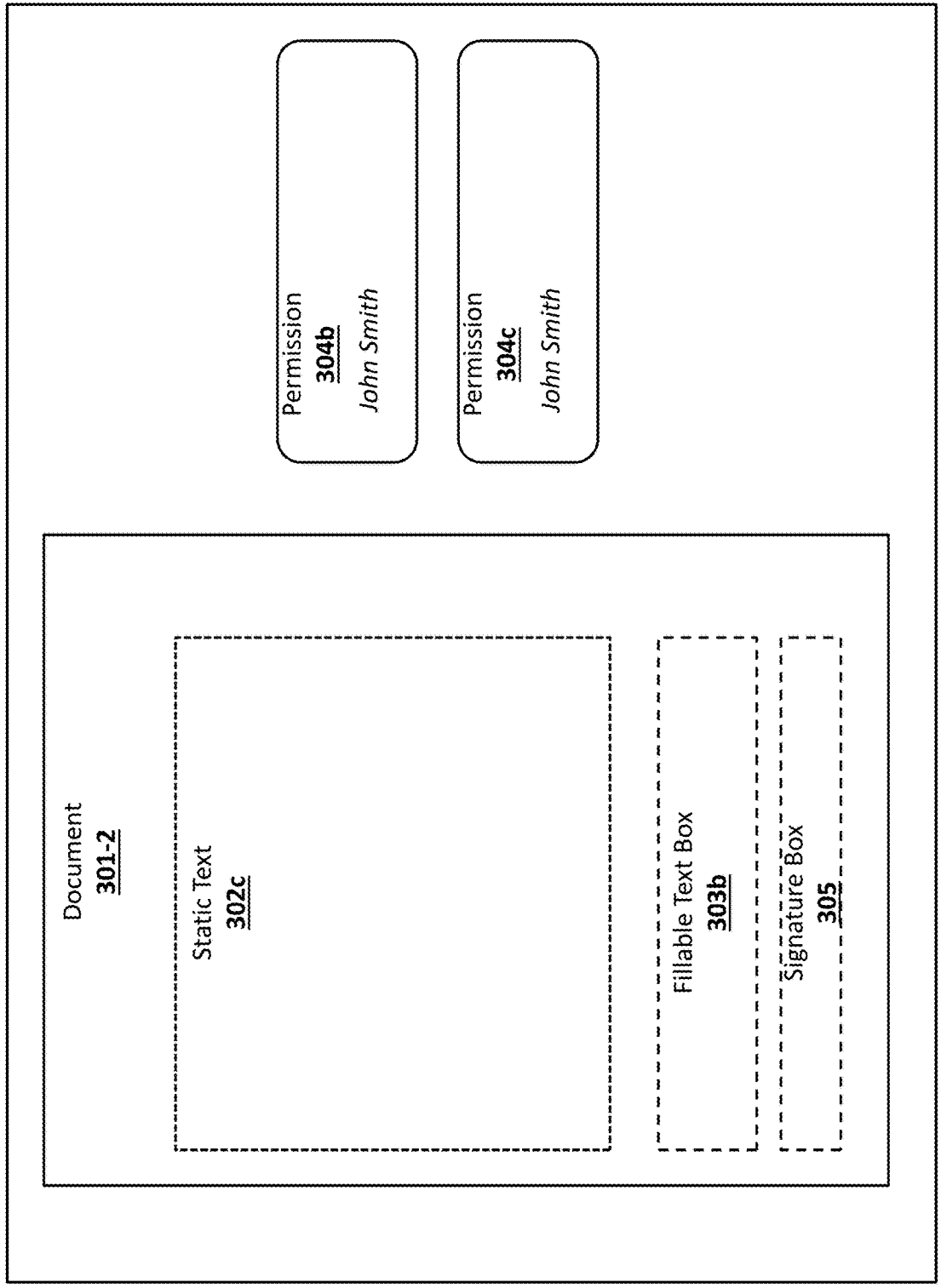

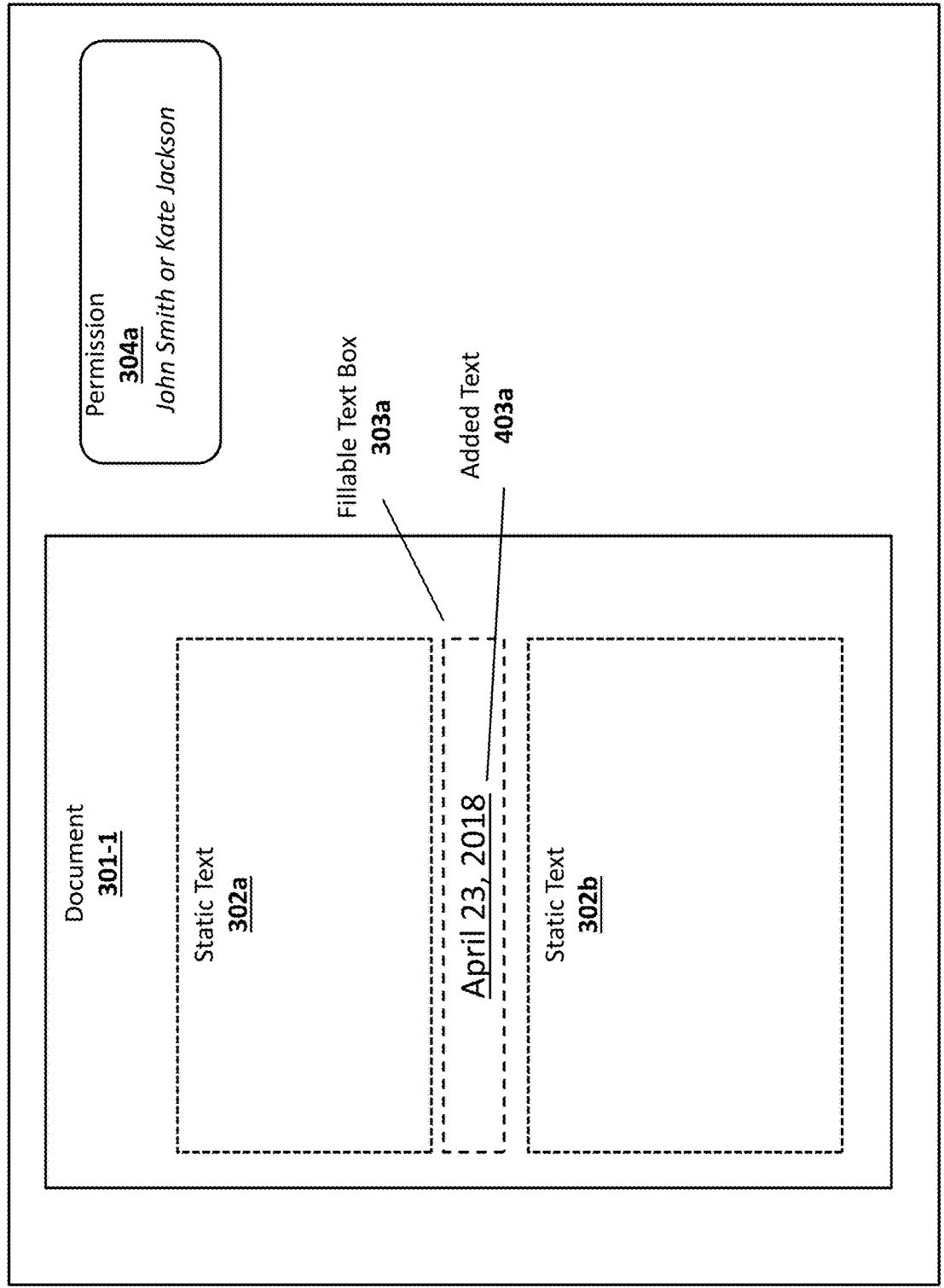

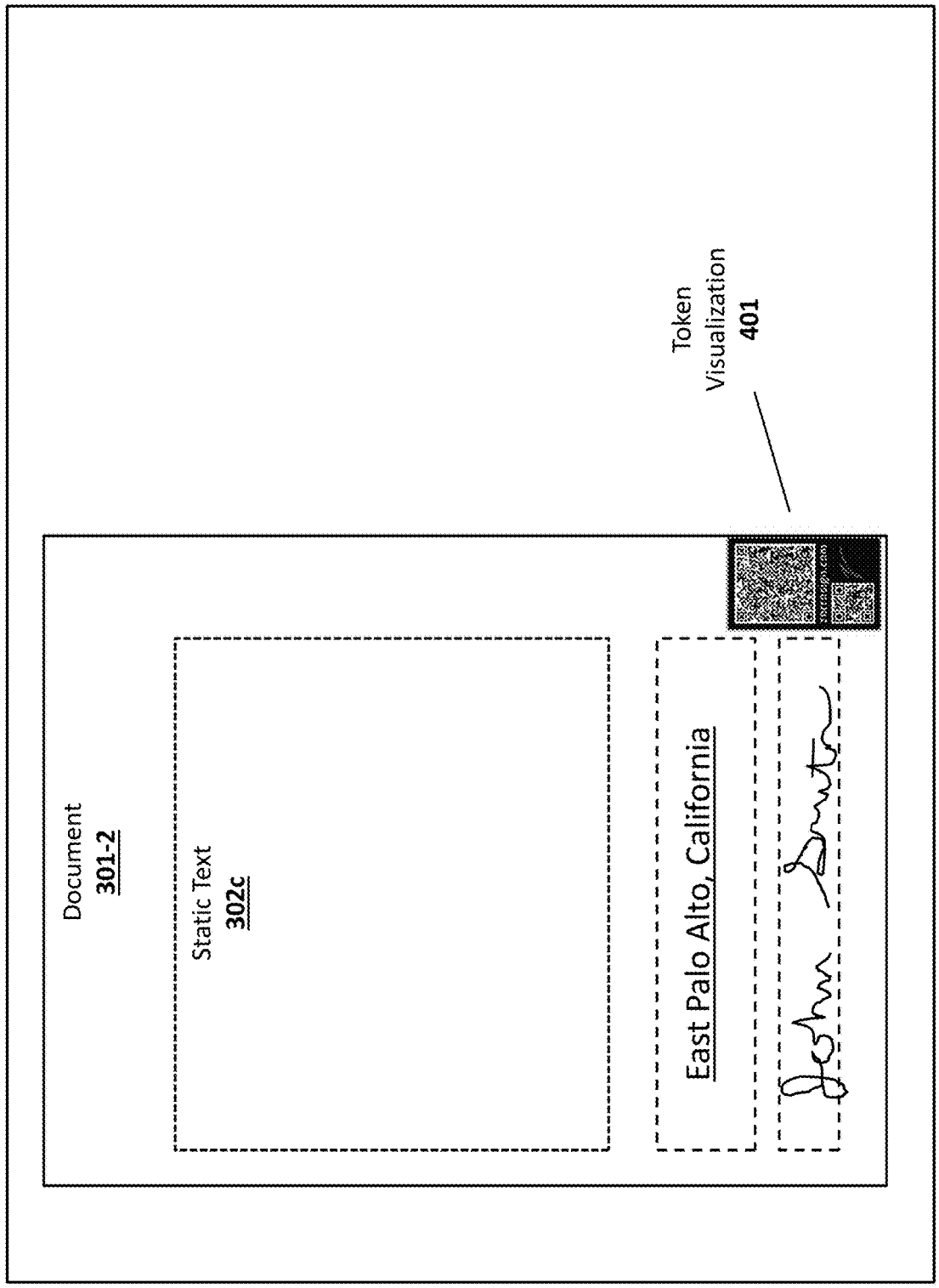

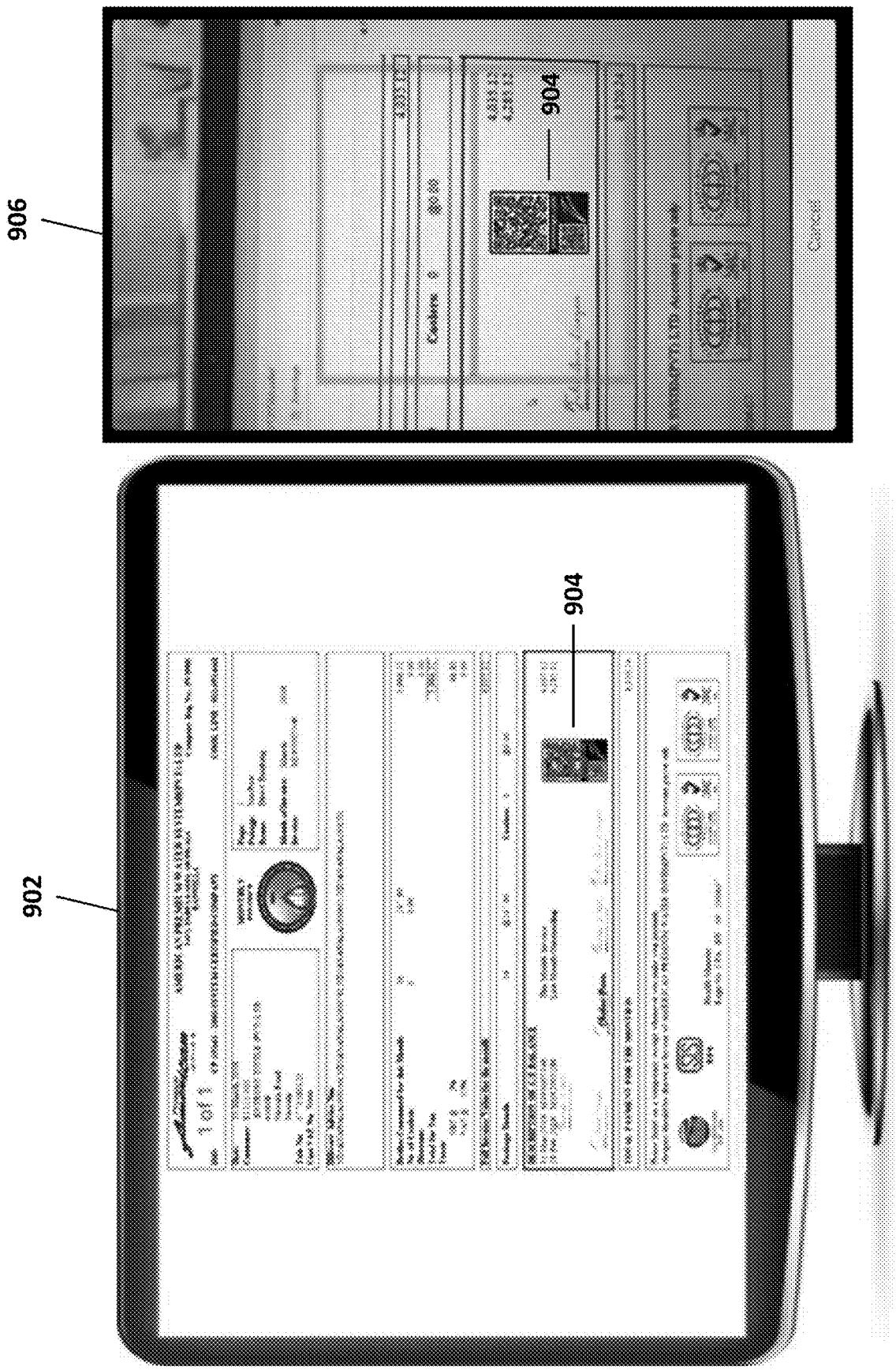

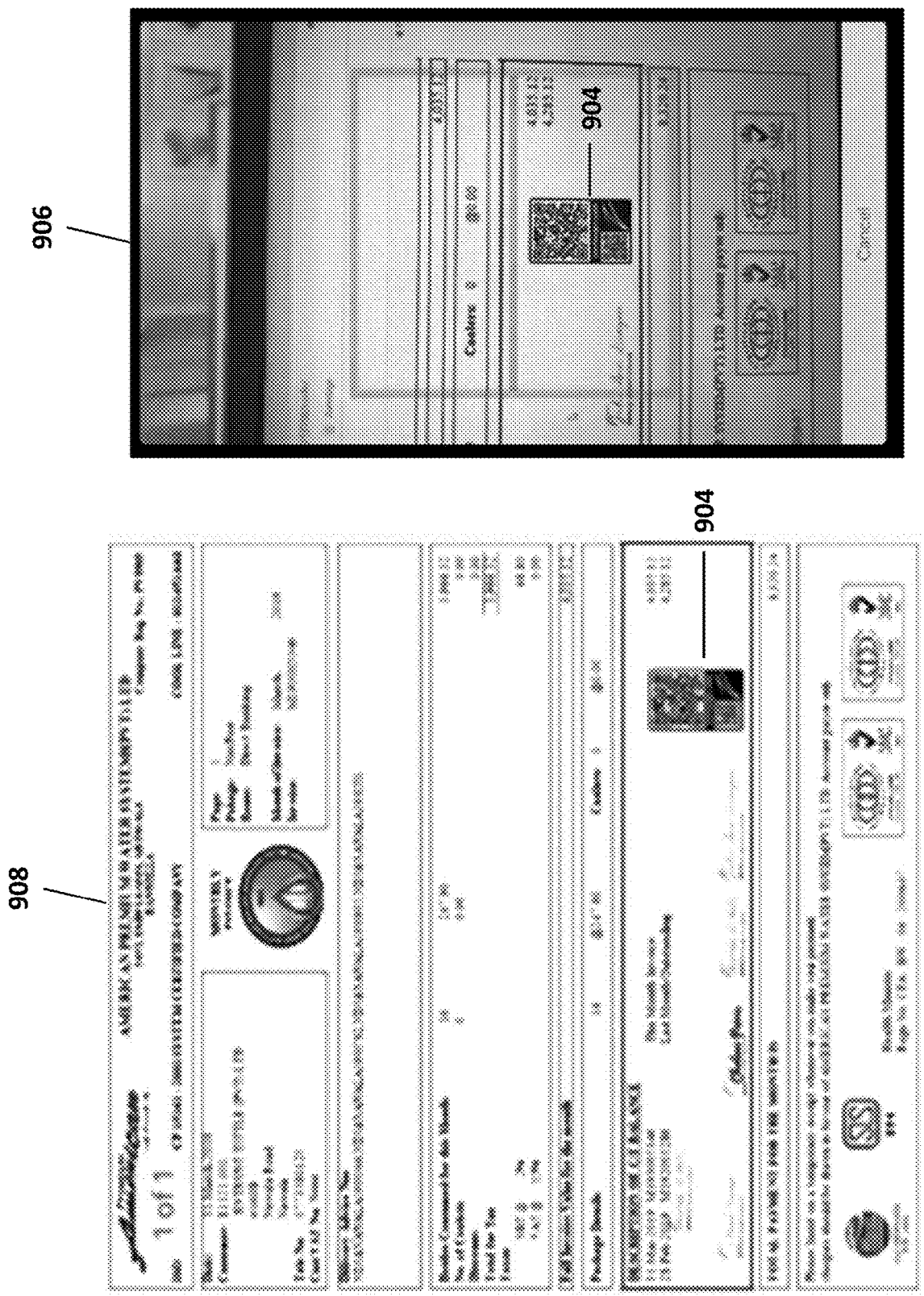

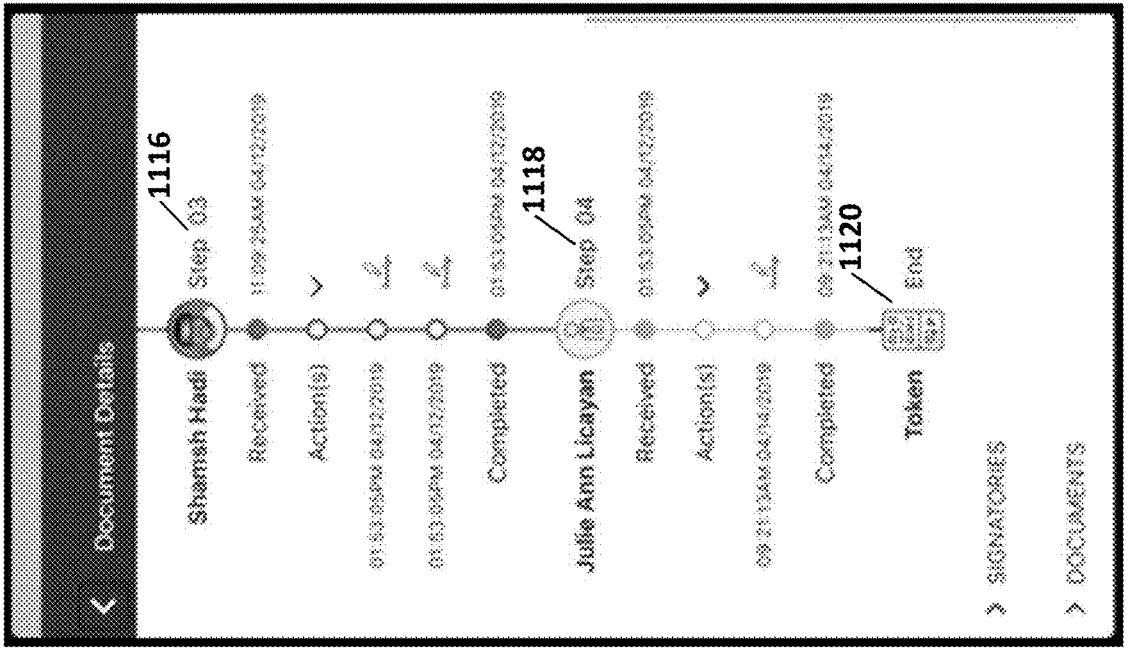
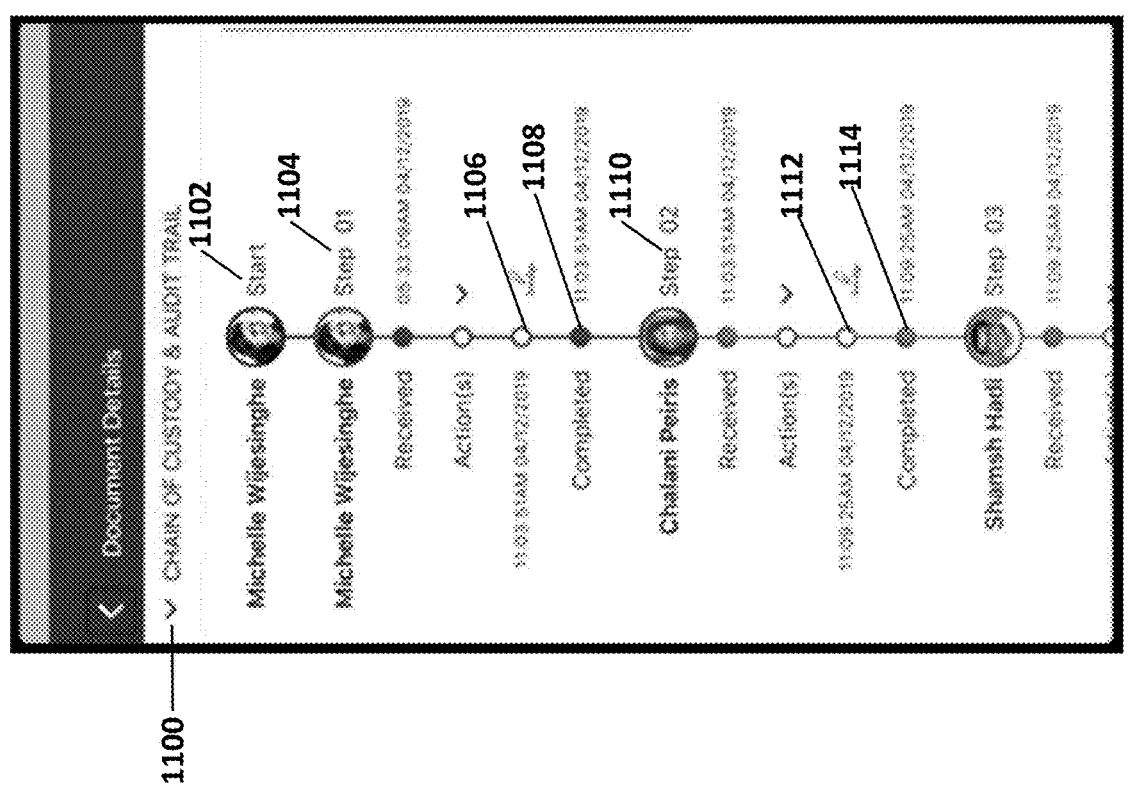
FIGURE 11

SYSTEM AND METHOD FOR SECURING ELECTRONIC DOCUMENT EXECUTION AND AUTHENTICATION

CROSS-REFERENCE TO RELATED APPLICATIONS

This application claims priority to U.S. Provisional Patent Application Ser. No. 62/666,339, entitled "System and Method for Securing Electronic Document Execution and Authentication," filed May 3, 2018, which is hereby incorporated by reference in its entirety.

TECHNICAL FIELD

The present embodiments provide an environment where a user first creates or imports a document comprising of fields to be completed by a user and/or one or more other users. All users who have view-only access or that can act on a document are considered to be "in the workflow." All users in the workflow (except view-only users) can take actions in the document by editing, adding or entering values or signatures in those fields. When the document is complete, a computing device adds an encrypted token visualization element to the document that uniquely identifies and secures the document. This element signifies the document signing ceremony completion which starts from document formation and ending with the signing process by all parties involved. Thereafter, a copy of the original document, all attachments, authentication, security and validation information, and all other relevant information about the document and users will be available to view in the chain of custody and audit trail for the document by the authorized users by scanning the token visualization element within the platform (web application or mobile application).

BACKGROUND

There are various known techniques to authenticate a person's signature on a document. In the pre-industrial age, it was common in certain European countries for someone to sign a document in ink and to then press a wax seal on the document to indicate the authenticity of that document. It was always possible, of course, that someone could tamper with the document, forge signatures and the wax seal.

Since the ancient Egyptian times, people have relied upon scribes (later called notary publics) to authenticate documents. Typically, a notary public will witness a person signing a document including attachments and will attempt to authenticate that person's identity by inspecting a driver's license, passport, or other identification for that person. Again, it is possible to forge such documents and signatures.

More recently, with the popularity of electronic or digital documents, partial digitization of business processes is taking place. This means from creation of documents to storage and subsequent retrieval of the signed documents; one or more steps are conducted digitally. For example, a document may be created on a computer and subsequently printed, signed with wet ink or electronically, then faxed, delivered via courier, or scanned into the computer and finally shared electronically via email or by using other file transfer mechanisms. Documents can be tampered with and signatures can be forged in this case as well.

Furthermore, there are real cases where documents are mixed-signed; that is when documents are signed with wet-ink first by some parties and then electronically signed by other parties. Documents in this case also can be tampered with and signatures can be forged in this case as well.

SUMMARY

Electronically signed or mixed-signed documents are shared with parties both whom are part of the workflow or external parties either electronically or on printed paper. Because electronic/digital documents can be altered using freely available software and then subsequently shared with external parties, a technical problem exists whereby the digital/electronic version of an electronically signed document can be shared with anyone, and the recipients of this "digitally modified" document cannot be certain of or otherwise prove the validation of the user and authenticity of the document, its content, and the signatures on it. The signatures applied to these documents are only images captured on electronic devices, signature pads, mouse pads, or other capturing devices and not an equivalent of a wet signature when signed with a pen.

Therefore, what is desired is a system that can first prove that the individual who is performing the action to sign the document is that said person, secondly apply a digital equivalent of their wet ink signature on the document, and finally prove the authenticity of a printed copy or digital version of an electronically signed document, its content, and the signatures on it. A system is desired that allows a validated user to create or prepare an electronic document and to allow one or more users to complete and sign that document in a particular sequence called the workflow while capturing the chain of custody and an audit trail of the actions taken on the document by the parties in the workflow, which includes recording key authentication, security and validation information when an action took place. In an illustrative embodiment, the system may store such information on a distributed ledger based on blockchain technology. Further, what is specifically desired is a system that: 1. authenticates the identity of each user, 2. captures and applies the equivalent of a wet signature on the document, 3. confirms the validity of the document and that the document is in its original form, has not been altered, expired, cancelled, or signature forged, and 4. that the document was executed by the said validated person with his/her knowledge. In addition, what is further desired is a mechanism for accessing a completed document through an audit trail by using the electronic mark by authorized parties. This method of restricting access to information in the ledger entries is also referred to as "permission-based access" in the blockchain paradigm of computing.

The embodiments described herein utilize token technology, such as the token mechanism described in PCT Publication No. WO 2011/005869 A2, published on Jan. 13, 2011, and titled "Method and System for Generating and Using Biometrically Secured Embedded Tokens in Documents," which is incorporated by reference herein.

The present embodiments provide an environment where a user first creates or imports a document comprising of fields to be completed by that user and/or one or more other users. All users who have view-only access or that can act on a document are considered to be "in the workflow." All users in the workflow (except view-only users) can take actions in the document by editing, adding or entering values or signatures in those fields. When the document is complete, a computing device adds an encrypted token visualization element to the document that uniquely identifies and secures the document. This element signifies the completion of the document formation and signing process by all parties involved. Thereafter, a copy of the original document, all attachments, authentication, security and validation information, and other relevant information about the document and users will be available to view in the chain of custody and audit trail for the document by the authorized users by scanning the token visualization element within the platform (web application or mobile application).

In one embodiment, a computer-implemented method comprises extracting and storing, by a computer, physical features of a handwritten signature of a first user; receiving, by the computer, a request to generate a document from a second user; setting, by the computer, a document permission for the first user based on an input from the second user; receiving, by the computer, an electronic signature corresponding to a second handwritten signature of the first user; in response to the computer validating the electronic signature of the first user based on the stored physical features of the handwritten signature of the first user: linking, by the computer, the document with the electronic signature of the first user based upon the document permission; and affixing, by the computer, an encrypted token visualization element on the document, the encrypted token visualization element configured to indicate a link between the electronic signature of the first user and the document.

In another embodiment, a system comprises a non-transitory storage medium storing a plurality of computer program instructions; and a processor electrically coupled to the non-transitory storage medium and configured to execute the computer program instructions to: extract and store physical features of a handwritten signature of a first user; receive a request to generate a document from a second user; set a document permission for the first user based on an input from the second user; receive an electronic signature corresponding to a second handwritten signature of the first user; in response to the processor validating the electronic signature of the first user based on the stored physical features of the handwritten signature of the first user: link the document with the electronic signature of the first user based upon the document permission; and affix an encrypted token visualization element on the document, the encrypted token visualization element configured to indicate a link between the electronic signature of the first user and the document.

In yet another embodiment, a computer-implemented method comprises receiving, by a computer from a client device, a scanned electronic copy of an encrypted token visualization element, the encrypted token visualization element being affixed to document in an electronic format or printed format; retrieving, by the computer, a plurality of data records of a sequence of events and corresponding timestamps associated with the document; and transmitting, by the computer to the client device, the sequence of events and corresponding timestamps configured to be displayed as a chain of custody and audit trail of the document in a graphical user interface of the client device.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the FIGS. are not necessarily to scale, emphasis instead being placed upon illustrating the principles of the disclosure. In the figures, reference numerals designate corresponding parts throughout the different views.

FIGS. 3A and 3B depict the creation of a document in a workspace operated on a client device, according to an embodiment.

FIGS. 4A, 4B, and 4C depict the editing of the document in a workspace operated on another client device and the addition of a token visualization element at the end of the editing process, according to an embodiment.

FIGS. 9A and 9B depict examples of scanning a token visualization element on documents in electronic and printed formats, according to an embodiment.

FIG. 11 depicts an example of a graphical user interface for chain of custody and audit trail, according to an embodiment.

DETAILED DESCRIPTION

Figure 1:
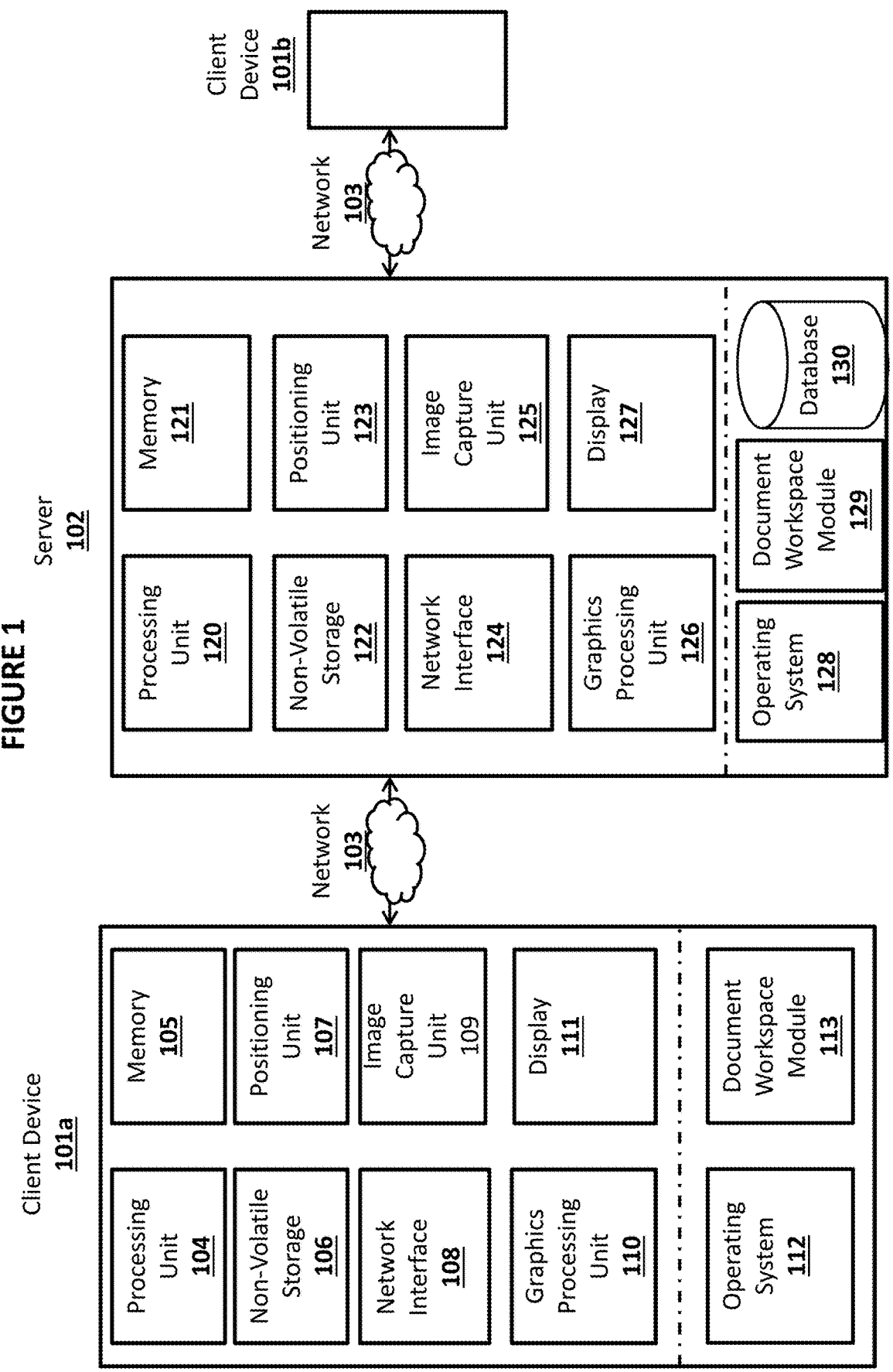
FIG. 1 depicts a system where multiple client devices communicate with a server, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

An example of the system architecture is described herein. FIG. 1 depicts client devices 101a and 101b (collectively or commonly referred to as 101) communicating through a secure, encrypted tunnel or network 103 with a server 102. The client devices 101a and 101b and server 102 communicate using trusted wired or wireless networking technologies, such as Ethernet, Wi-Fi, cellular data, etc.

A client device 101 comprises a plurality of hardware components. For example, the client device 101 may be a computing device that comprises a processing unit 104, a memory 105, a non-volatile storage 106, a positioning unit 107, a network interface 108, an image capture unit 109, a graphics processing unit 110, and a display 111. The client device 101 can be a smartphone, notebook computer, tablet, desktop computer, gaming unit, wearable computing device such as a watch or glasses, or any other computing device.

The processing unit 104 optionally comprises of a microprocessor with one or more processing cores. The memory 105 optionally comprises dynamic random access memory (DRAM) or static random access memory (SRAM) volatile memory. The non-volatile storage 106 optionally comprises a hard disk drive or flash memory array. The positioning unit 107 optionally comprises a GPS unit or GNSS unit that communicates with GPS or GNSS satellites to determine latitude and longitude coordinates for client device 101, usually output as latitude data and longitude data. The network interface 108 optionally comprises a wired interface (e.g., Ethernet interface) or wireless interface (e.g., Wi-Fi, 3G, 4G, 5G, 6G, LTE, GSM, 802.11, protocol known by the trademark "Bluetooth," etc.). The image capture unit 109 optionally comprises one or more standard cameras (as is currently found on most smart devices and notebook computers). The graphics processing unit 110 optionally comprises a controller or processor for generating graphics for display. The display 111 displays the graphics generated by the graphics processing unit 110 and optionally comprises a monitor, touchscreen, or other type of display.

The client device 101 comprises a plurality of software components. Client device 101 comprises an operating system 112 (such as the operating systems known by the trademarks "Windows," "Linux," "Android," "iOS," or others) and a document workspace module 113. The document workspace module 113 comprises of lines of software code executed by the processing unit 104 to perform the functions described below.

For example, the client device 101 can be a smartphone, and the document workspace module 113 can be a downloadable app installed on the smartphone (e.g., downloaded from an application marketplace and installed on the smartphone). The client device 101 also can be a notebook computer, desktop computer, game system, or other computing device, and the document workspace module 113 can be a software application running on the client device 101.

The server 102 comprises a plurality of hardware components. The server 102 is a computing device that comprises a processing unit 120, a memory 121, a non-volatile storage 122, a positioning unit 123, a network interface 124, an image capture unit 125, a graphics processing unit 126, and a display 127. Although the server 102 is depicted as a single machine, it should be understood that server 102 can comprise of multiple machines, such as multiple physical servers located in a server farm or located remotely from one another. This method of utilizing multiple servers may also be known as "multiple nodes" in the "blockchain" paradigm of computing.

The server 102 comprises a plurality of software components. The server 102 comprises operating system 128 (such as the (server side) operating systems known by the trademarks "Windows," "Linux," "Android," "iOS," or others), a document workspace module 129, and a database 130. The document workspace module 129 can be identical to document the workspace module 113 operating on the client devices 101, or it can be different.

Figure 2A:
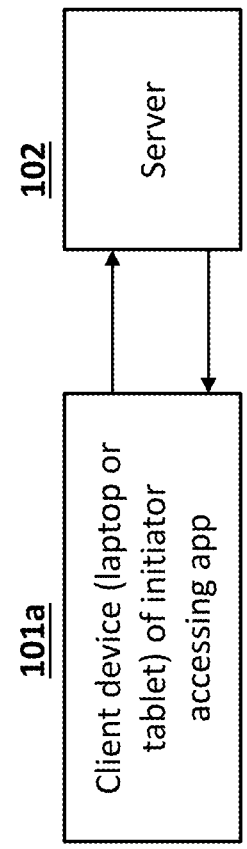
FIGS. 2A to 2G depict a method, according to an embodiment.
Figure 2B:
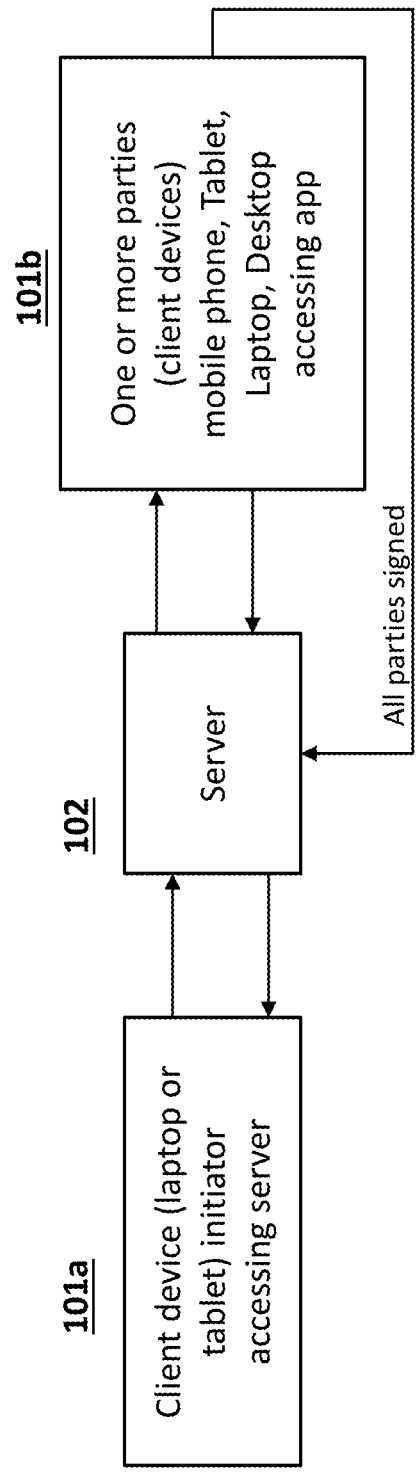
Figure 2C:
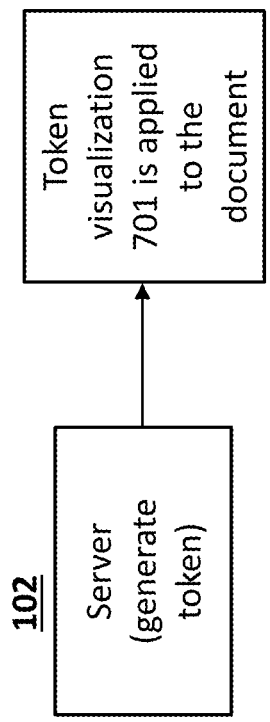
Figure 2D:
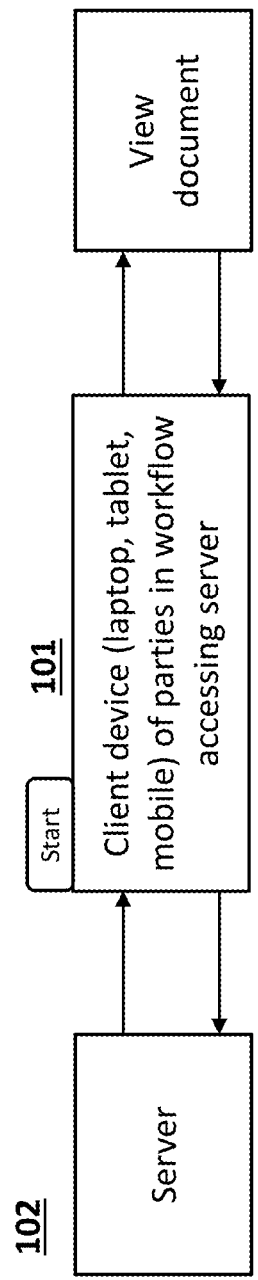
Figure 2E:
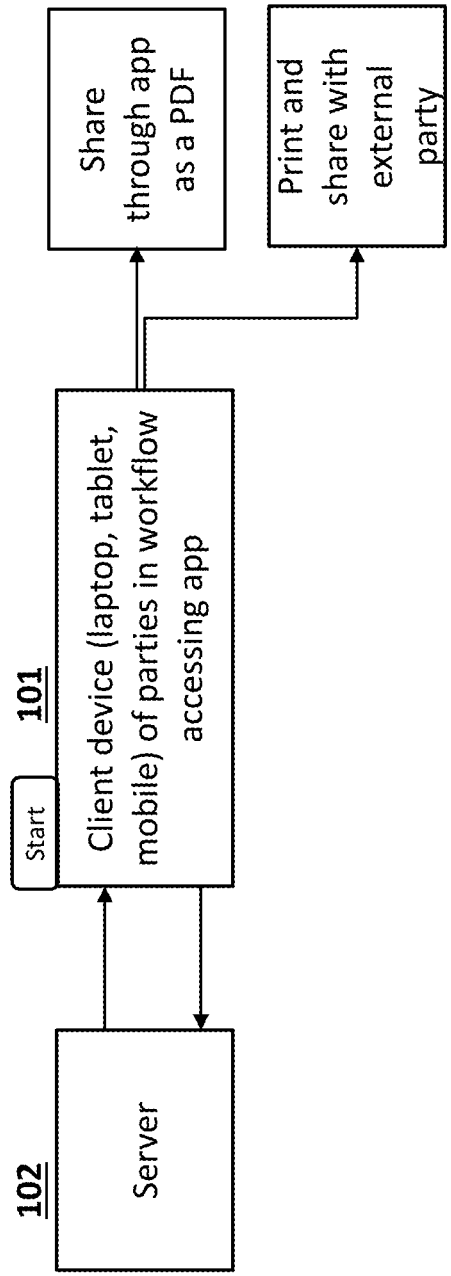
Figure 2F:
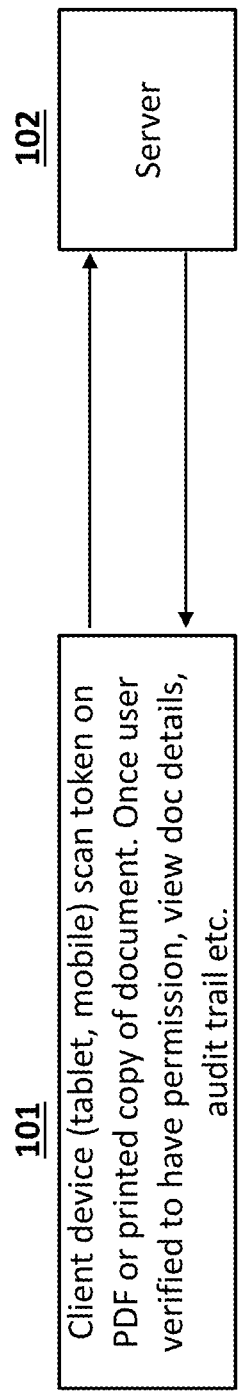
Figure 2G:
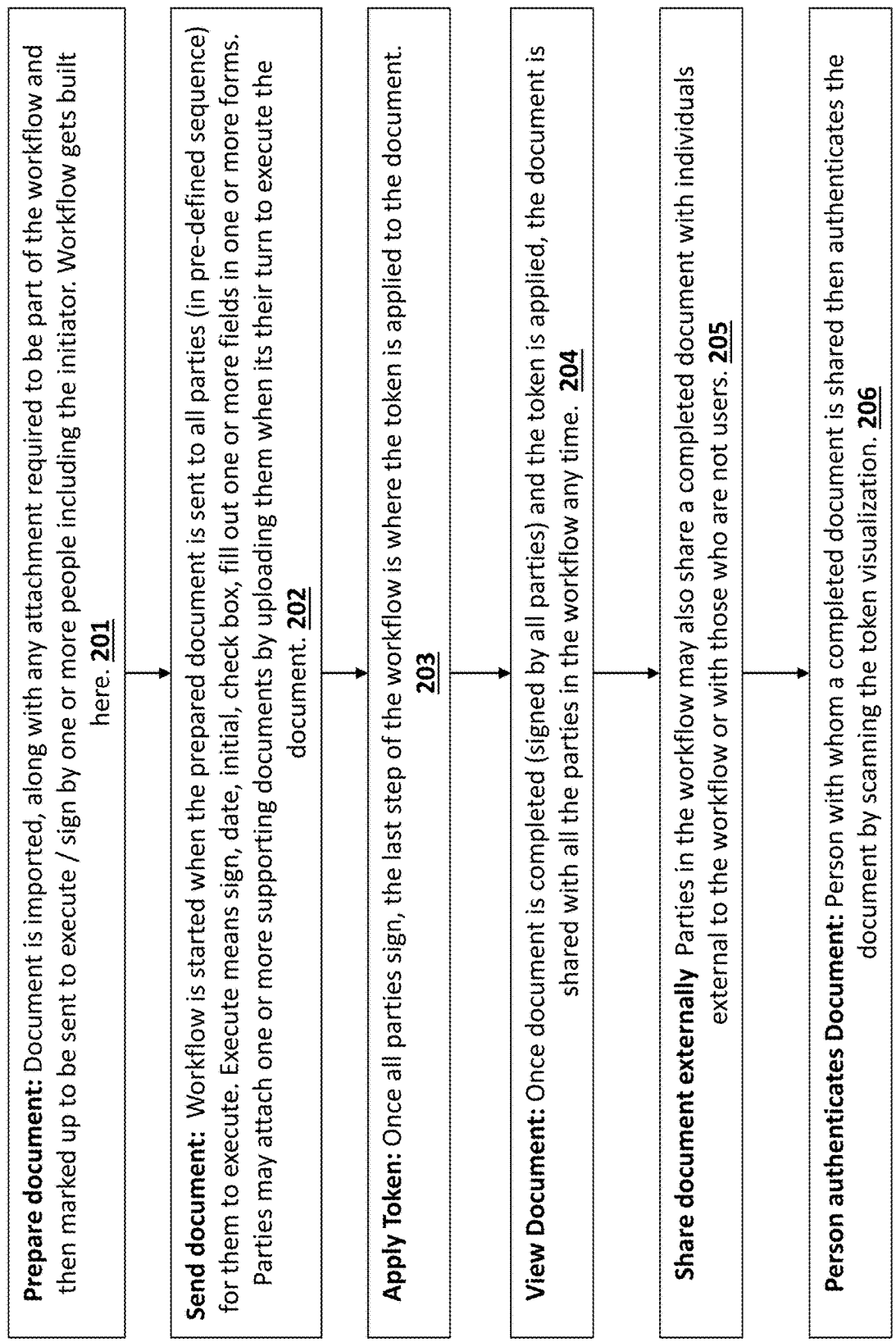

FIG. 2G depicts an example method executed by the systems described herein, according to an embodiment. FIGS. 2A to 2F depict further detail regarding the implementation of each step shown in FIG. 2G. First, a document is prepared (FIG. 2A—Step 201). The document is prepared on client device 101a and is imported into server 102. Next, the document is sent to one or more other parties for execution (FIG. 2B—Step 202). Execution includes to add a tag on the document to sign, date, initial, check box, enter text, enter name, company, title, phone number, email address, sticky note, seal, etc. in order to fill out one or more fields in documents or forms. This step involves activity within a workflow where all parties must act on and sign the document. A signature equivalent to a person's wet signature is captured at the time of registration through the proprietary mobile app. Users are asked to create a genuine handwritten signature that is captured through client device 101 prior to signing the first document. The information that is captured in the backend is information including but not limited to digital information, vector information, physical characteristics, a security certificate, metadata, biometrics, and signatory attribution, which is embedded in the PDF document that the user is signing. The image of the signature that the user sees on the document is a visualization of the metadata (of the signature) that was applied to the encrypted PDF that holds the record of the signature placed by the user. Next, a unique token 501 (FIG. 6) is generated, and a token visualization element 401 is placed onto the final document (FIG. 2C—Step 203). Throughout the life cycle of the document in the above-mentioned process, the actions, user information and the actual document may be stored on blocks within the private permissions-based blockchain platform devised. Blocks are updated every two minutes to ensure that the data is regularly being updated and recorded to ensure and provide trust to all parties using the platform. Additionally, the document is stored in a hash within the nodes on the server (depending on the deployment option used it can be on server 102 or its related nodes that are on the cloud, or on the user's private servers). Using PKI infrastructure to access the document, where the token visualization element 401 is the public key and the private key is the user's device, client device 101a, who was part of the workflow or a user, possibly client device 101b, who was given view only permission, can access the document, the parties may subsequently view the completed document, its attachments and the chain of custody and audit trail, using one or more client devices 101 (FIG. 2D—Step 204). The parties optionally may share the document with external parties via electronic means or by printing on paper (FIG. 2E—Step 205). Finally, external parties who receive such shared documents can authenticate the document by scanning the token to view the document, its attachments, the chain of custody and the complete audit trail (FIG. 2F—Step 206).

FIGS. 3A and 3B depict the creation or preparation of document 301 (with pages labeled 301-1 and 301-2) in workspace 300 operated on client device 101a. Workspace 300 comprises of a user interface generated on display 111 that allows a user to create and edit document 301 or to import and edit or mark-up document 301 after it was created in another application. Before the user is allowed to operate workspace 300, client device 101a authenticates the user through known techniques, such as a user name and password, a fingerprint scan, a retinal scan, SMS OTP or other known multi factor authentication techniques.

A user creates document 301 in workspace 300 or imports document 301 into workspace 300 after creating document 301 using another application, such as word processing applications or a PDF application. In this embodiment, workspace 300 maintains document 301 in PDF format (except for dwf files, which are maintained in DWF format), but document 301 attachments can be maintained in any format including but not limited to .pdf; .rtf; .doc; .docx; .xls; .xlsx; .jpg; .jpeg; .png; .tiff; and .dwf., which means that the original file format is maintained for attachments. Document 301 comprises of static text 302a, 302b, and 302c. Document 301 also comprises fillable text box 303a that the user adds to document 301 using workspace 300. Fillable text box 303a might be used, for example, to allow a user to input a date, the name of the document, the name of a party to the document, or other information. The user who adds a fillable text box 303a to document 301 optionally can create a permission field 304a for fillable text box 303a and specify the user or users who will be allowed to edit the text in fillable text box 303 using workspace 300 or a similar workspace. In this example, permission has been provided to "John Smith" and "Kate Jackson" in permission field 304a. Similarly, the user has added fillable text box 303b and permission field 304b (providing permission only to "John Smith") and signature box 305 and permission fields 304c (providing permission only to "John Smith.").

In this example, the user who establishes document 301 in FIGS. 3A and 3B is Kate Jackson. When Kate Jackson has completed document 301, the document is automatically saved on the server in a hash using PKI infrastructure and she can also save the document locally on computing device 101a by downloading it or printing it. Later, other users can also access document 301. Kate Jackson optionally can cause an invitation to edit document 301 to be sent to other users, such as to John Smith.

Figure 4B:
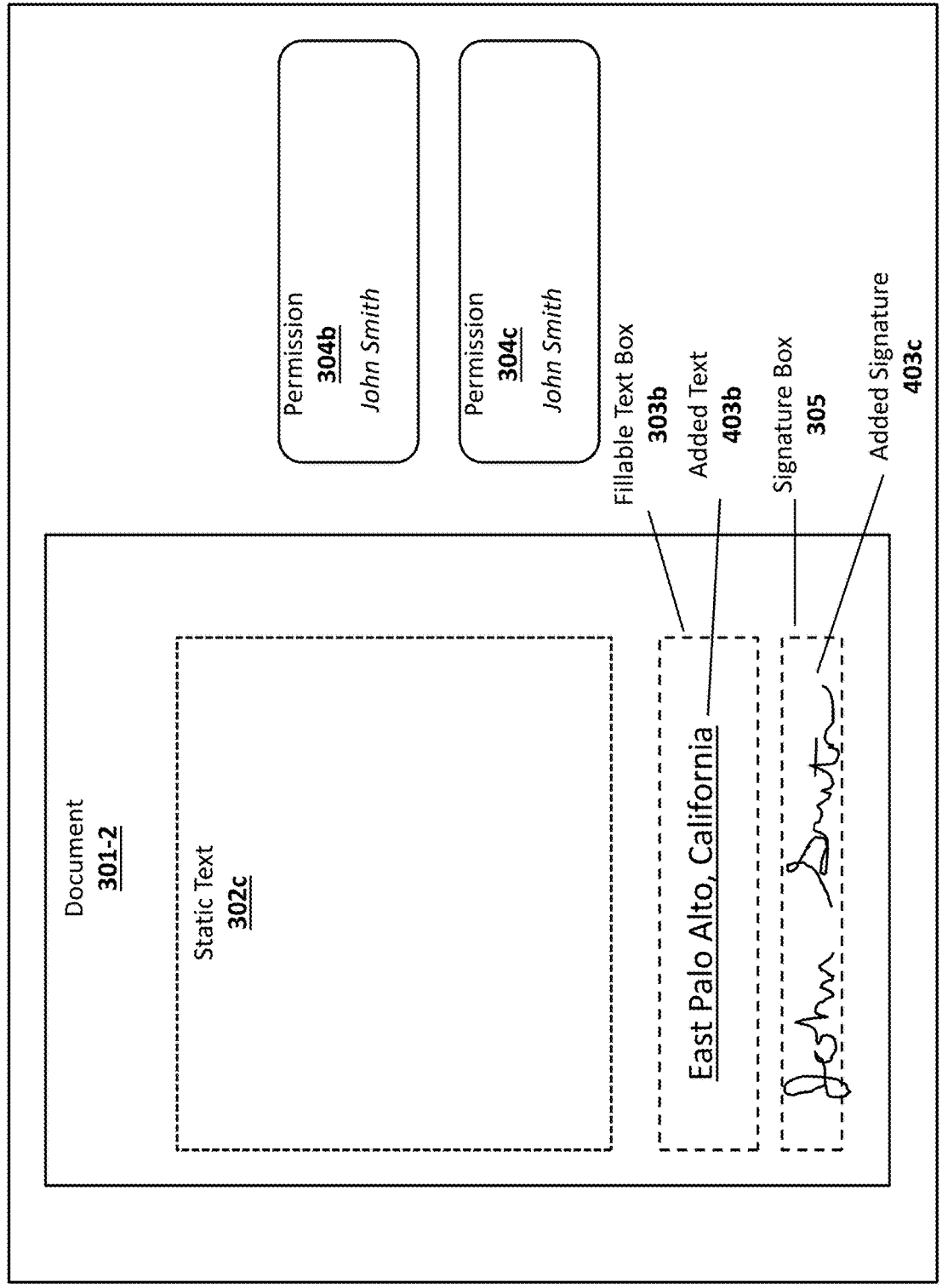

FIGS. 4A, 4B, and 4C depict the editing of document 301 by the user John Smith in workspace 400 operated on client device 101b. Here, the user edits document 301 to add text ("Apr. 23, 2018") into fillable text box 303a and text ("East Palo Alto, Calif.") into fillable text box 303b. The user is then allowed to do this because he has been granted permission to do so in permission fields 304a and 304b. Before the user can operate workspace 400, client device 101b authenticates the user through known techniques, such as a user name and password, a fingerprint scan, a retinal scan, facial identification, SMS OTP or other known multi factor authentication techniques.

The user further edits document 301 to add his signature 403c into signature box 305. Signature 403c is encrypted data stored in database 130 of the user's signature and accessed from client device 101b, by running his/her finger along the touch screen or finger print reader, validating their facial recognition or it can be additional computer-generated validation techniques used on smart devices, laptops or desktops. At this time, the system captures critical metadata about the signature, user, user environment, and content of the document, such as IP address, geolocation, and more.

Based on the fields established for document 301 by the user Kate Jackson, the editable fields have now been completed. Once this occurs, token visualization element 401 is added to document 301, as seen in FIG. 4C. Additional detail regarding the creation of token visualization element 401 is contained below. Thereafter, John Smith can save the document locally on computing device 101b and on server 102. Later, other users can access document 301 on a read-only basis.

Figure 5A:
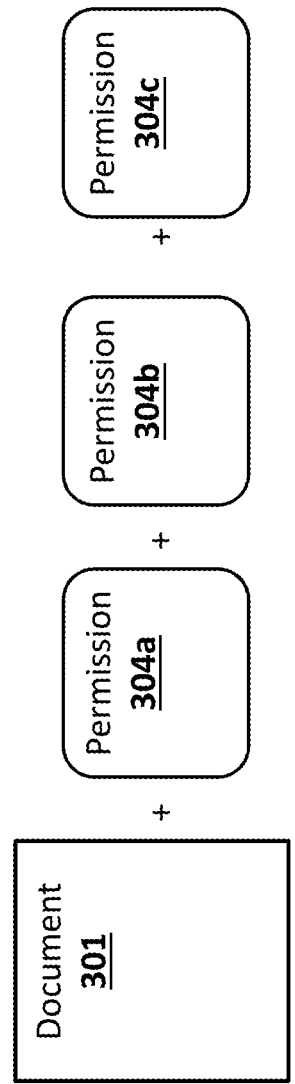
FIGS. 5A and 5B depict the generation of a token as the final step in the workflow of the document execution process of FIGS. 3A-3B and 4A-4C, according to an embodiment.
Figure 5B:
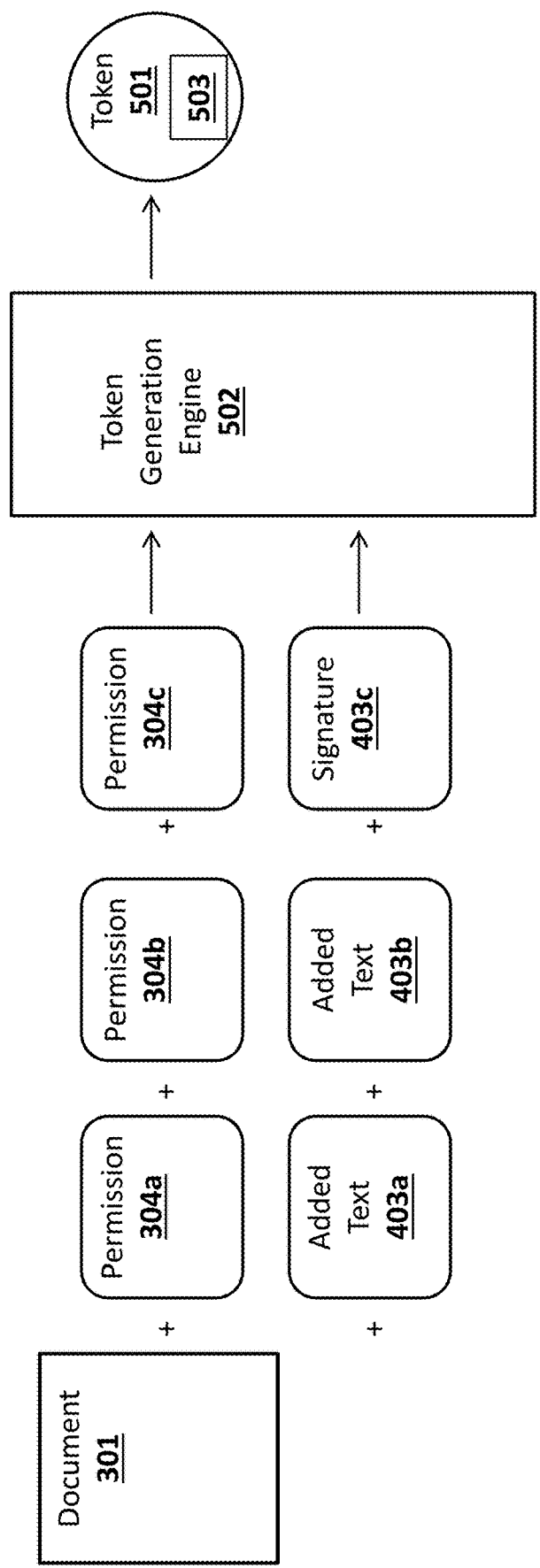

FIGS. 5A and 5B depict the generation of ledger entries during the document execution process of FIGS. 3 and 4. FIG. 5A corresponds to FIG. 3. Here, the user generates Permission Fields 304a, 304b, and 304c (action controls) which are added to document 301. FIG. 5B corresponds to FIG. 4. Here, the user generates added text 403a, added text 403b, and signature 403c, which is added to document 301 and permission fields 304a, 304b, and 304c. The result is then input to token generation engine 502, which takes the input and generates Token 501. Token generation engine 502 can utilize various encryptions and algorithms to generate token 501. Token 501 is associated with a unique token ID 503. In one algorithm, a hash function is applied to the input to generate an output that uniquely corresponds to the input. That output becomes part of token 501. One mechanism for generating a token is described in PCT Publication No. WO 2011/005869 A2, which was described previously and incorporated by reference herein.

Figure 6:
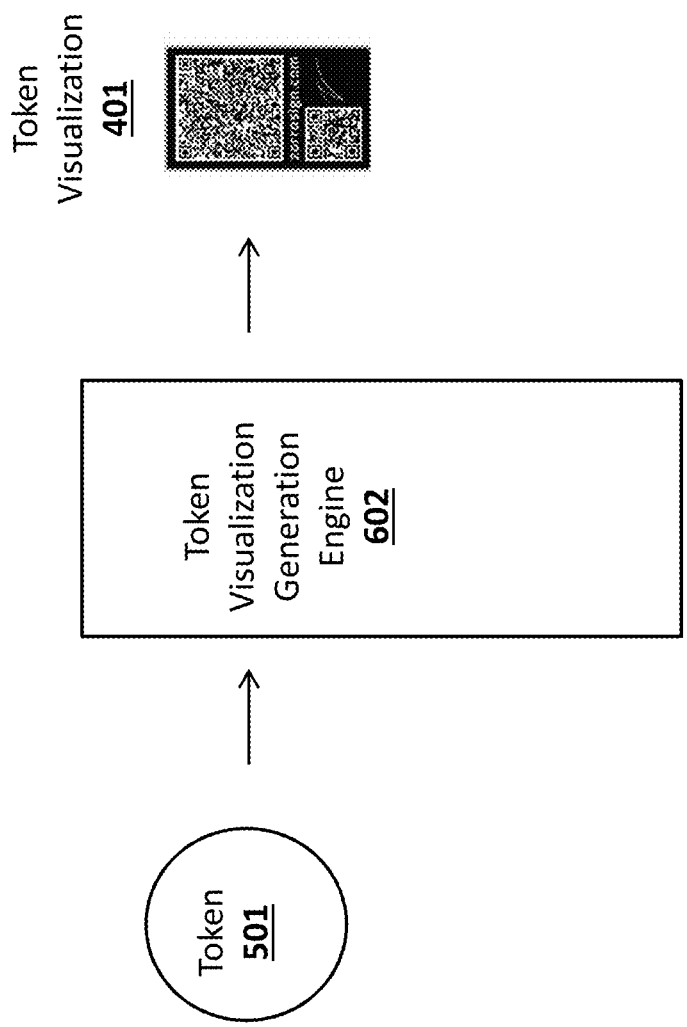
FIG. 6 depicts the generation of a token visualization element from a token, according to an embodiment.

In FIG. 6, because token 501 represents the completion of document 301, token visualization element 401 is generated by token visualization generation engine 602 using token 501 as an input. Various encryptions and algorithms can be used. In one algorithm, token 501 comprises of binary data, and token visualization generation engine 602 is a QR code generator that generates a unique QR code based on that binary data using advanced techniques.

Figure 7:
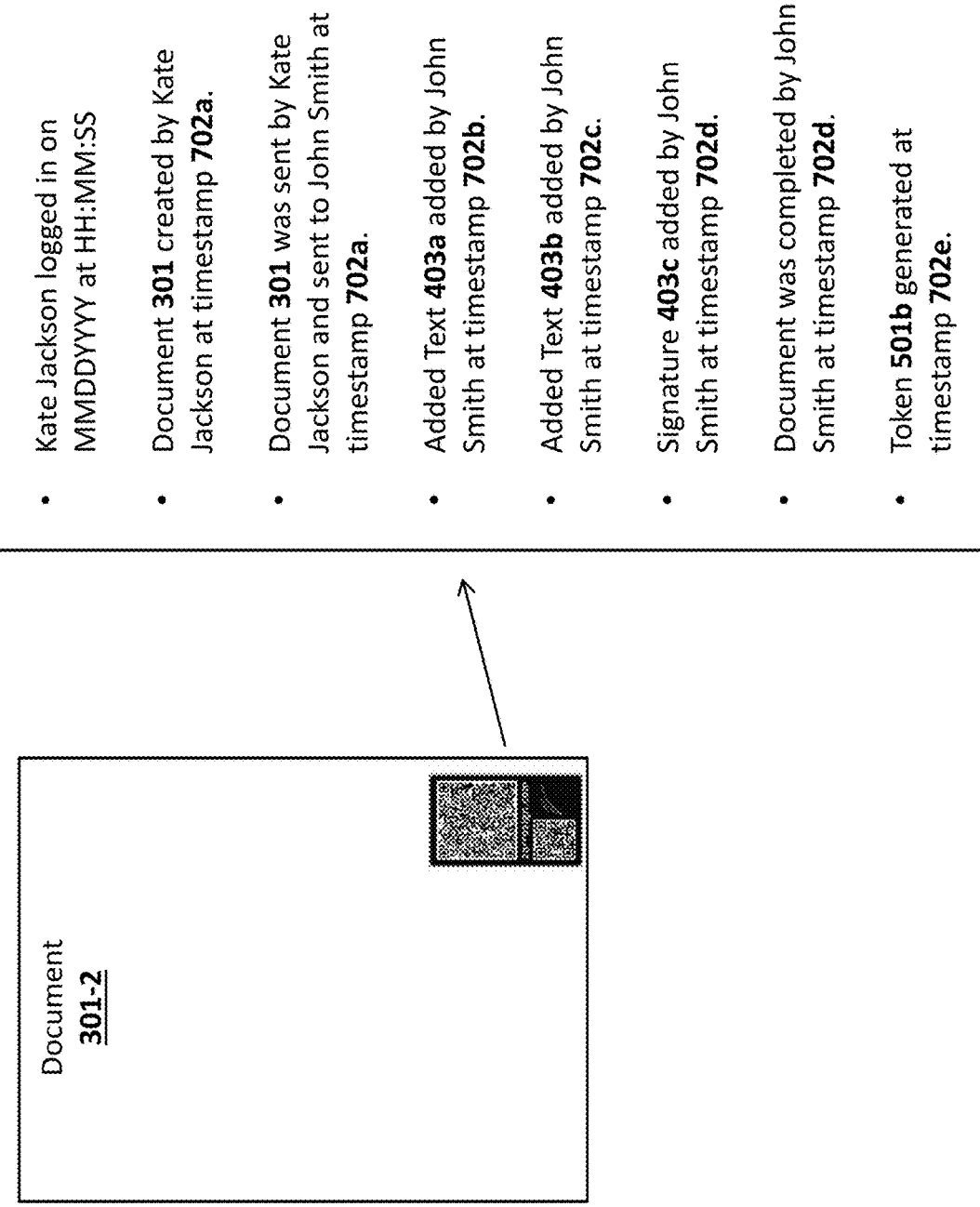
FIG. 7 depicts the chain of custody and the audit trail generated in response to an image captured (scanned) of a token visualization element, according to an embodiment.

In FIG. 7, after token visualization element 401 is generated, any user (including users Kate Jackson and John Smith) can access document 301, including added text 403a and 403b, signature 403c, using token visualization element 401. For instance, a computing device 101 with a camera and the mobile app installed can scan the image of token visualization element 401, which then causes computing device 101 to access document 301 from server 102.

In addition, any user authorized can access audit trail 701, which documents each step at which document 301 was modified. Thus, audit trail 701 comprises the following events:

Document 301 created by Kate Jackson at timestamp 702a

Added text 403a added by John Smith at timestamp 702b

Added text 403b added by John Smith at timestamp 702c

Signature 403c added by John Smith at timestamp 702d In addition, chain of custody events are also recorded in Audit Trail 701 like:

Kate Jackson logged in on MMDDYYYY at HH:MM:SS

Document 301 was sent by Kate Jackson and sent to John Smith at timestamp 702a

Document was completed by John Smith at timestamp 702d

Here, timestamps 702a, 702b, 702c, and 702d comprise of date and time information and optionally comprise of network information such as Internet Protocol address (IP address) of the device and geolocation information generated by positioning unit 107 or 123. Chain of custody and audit trail 701 can be viewed using a workspace such as workspace 300 or 400 designed to work with document workspace module 302 or 502, or it can be viewed inside a proprietary mobile app or the web application through standard browsers.

Figure 8:
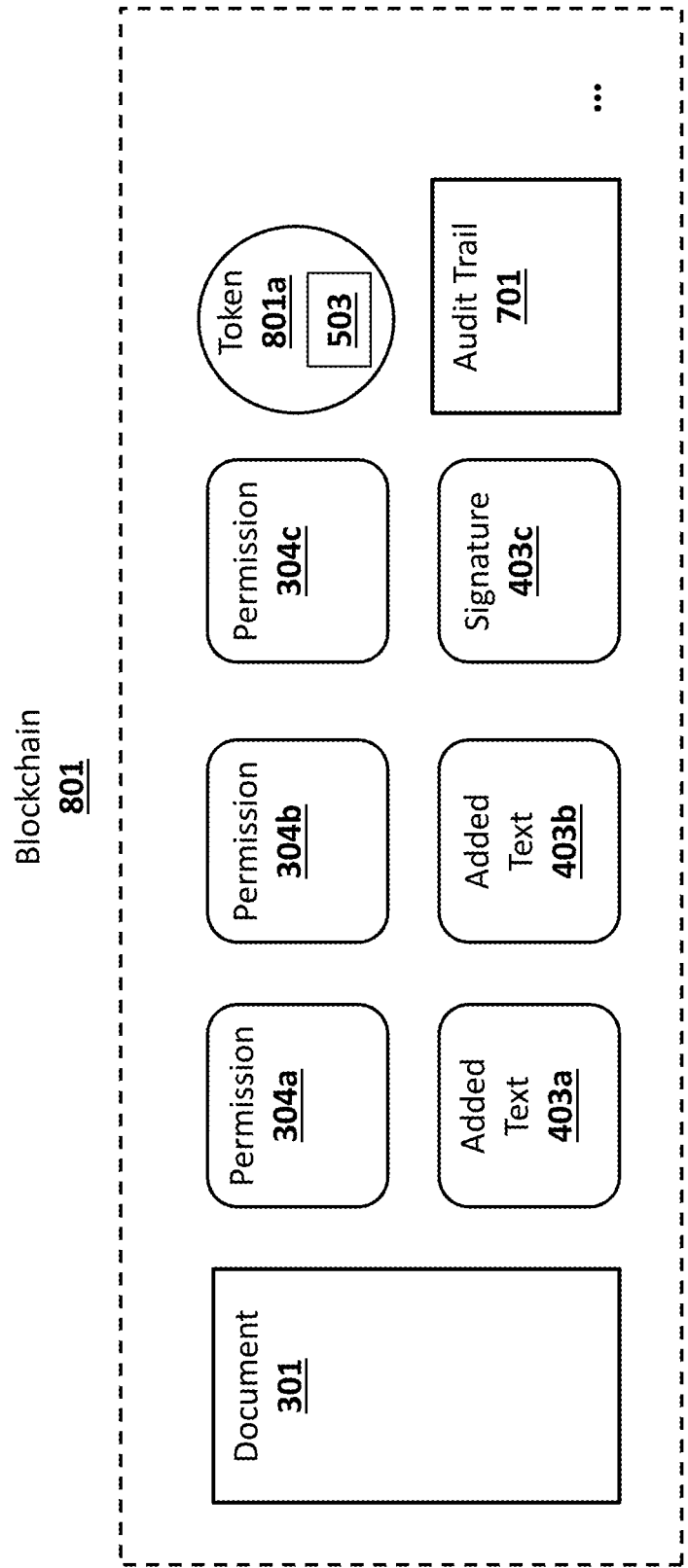
FIG. 8 depicts a blockchain structure for storing a document, permission fields, token, added text, a signature, and an audit trail, according to an embodiment.

FIG. 8 depicts blockchain 801, which is one possible mechanism by which to store the data discussed herein. Blockchain 801 is stored in non-volatile storage 106 of one or more computing devices 101 and/or non-volatile storage 403 of server 102. Here, document 301; permission fields 304a, 304b, and 304c; token 501; added text 403a and 403b; signature 403c; and audit trail 701 are stored in blockchain 801.

In this example, blockchain 801 follows an architecture that Applicant refers to as a "Private (permissioned) Closed Blockchain" or PCB and "Private (permissioned) Open Blockchain" or POB. The PCB is not a transaction-level ledger because it does not allow any user to access the ledger inside token 501. Instead, the PCB ledger is an action-level activity ledger that tracks and records information including but not limited to digital information, vector information, physical characteristics, a security certificate, meta data, biometrics, and signatory attribution for all users who participated in the workflow and actioned the document. This information is captured by the system for security, verification and authentication purposes and not available for the users to view/access. This information captures the indelible truth of the document.

The "Private (permissioned) Open Blockchain" or POB architecture allows the users of the workflow (in this case of document 301) to access transaction-level ledger entries provided they have the proper credentials and access permissions. In this context, transaction-level refers to actions such as when the document was actioned on and signed, whom the document was shared with, when the document was printed, when the document was downloaded onto a client device 101, when the document was rejected, etc. This information is depicted through the chain of custody and audit trail, which can be viewed by the user when they scan token 401 through the proprietary mobile app.

It will be understood by those of skill in the art that blockchain 801 can be implemented using PCB or POB architectures or both. However, this technology considers PCB and POB to be unique and the proprietary technology is using the variation of the implementations of PCB and POB together to secure the user, data, documents and the transaction.

Optionally, blockchain 801 can be used to store additional documents and related data created by computing devices 101 or server 102, such as information about attachments to the document, biometrics of the users if they had chosen to use that additional methods of securing their documents.

In one embodiment, blockchain 801 is stored in its entirety on multiple computing devices 101. In another embodiment, blockchain 801 is stored only on server 102 along with its multiple nodes in different geographic locations on the cloud.

FIGS. 9A and 9B depict an example of scanning a token visualization element, according to an embodiment. FIG. 9A shows that the server may display a document on an electronic device screen 902, such as on a laptop screen. The document may be in PDF format or any other format. The document may include a token visualization element 904. As shown in the figure, a user operating a client device 906 may use the client device to scan the token visualization element 904 displayed on the electronic device screen 902. For example, the user may use his/her smart phone to scan the token visualization element 904 displayed on the electronic device screen 902.

FIG. 9B shows that the document is printed in a piece of paper 908. As shown in the figure, the user operating the client device 906 may use the client device to scan the token visualization element 904 in the paper document 908. For example, the user may use his/her smart phone to scan the token visualization element 904 in the paper document 908.

Figure 10:
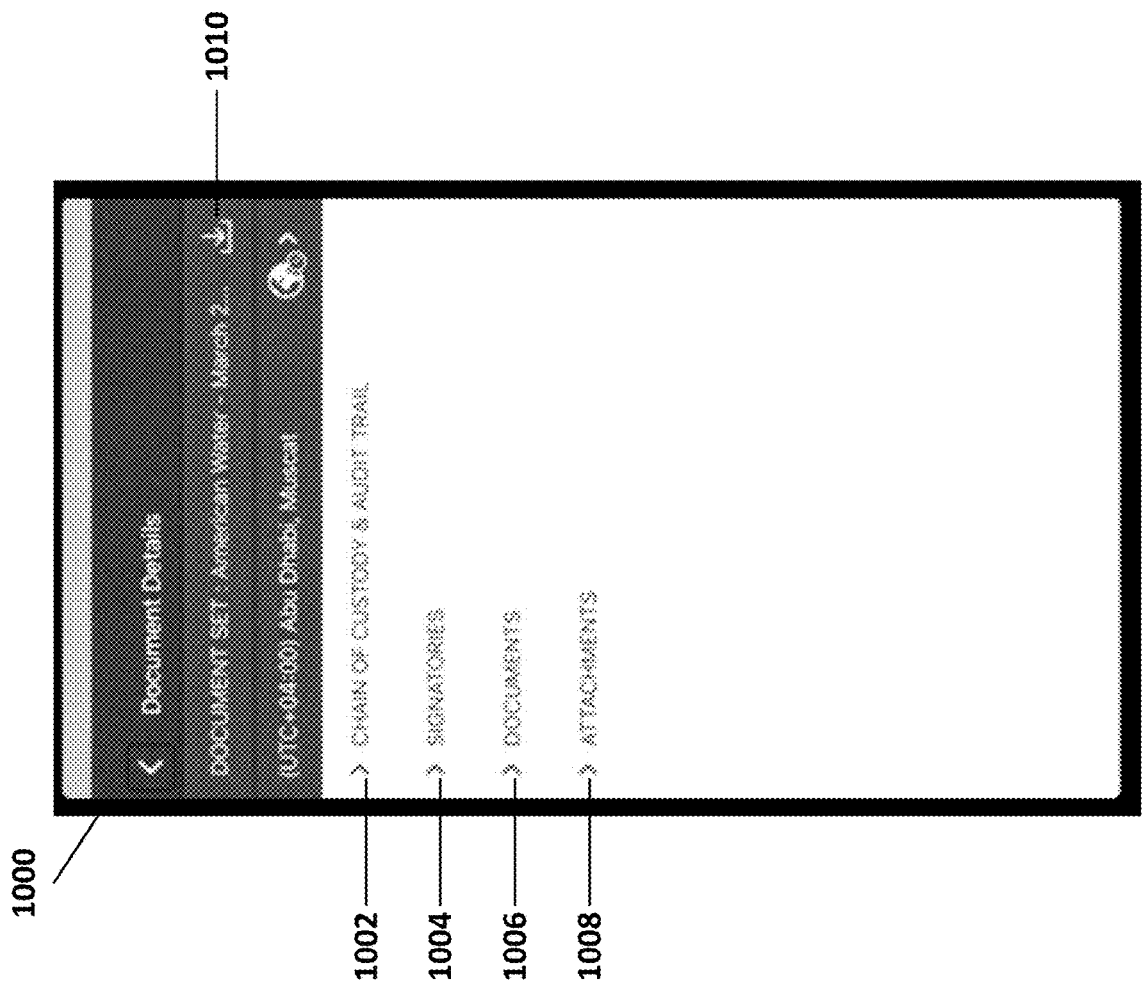
FIG. 10 depicts an example of a graphical user interface after the scanning of the token visualization element, according to an embodiment.

FIG. 10 depicts an example of a graphical user interface 1000 after the scanning of the token visualization element, according to an embodiment. After the user scans the token visualization element, the server may display a graphical user interface (GUI) 1000 on the client device that allows the user to access more details of the document. For example, the GUI 1000 may include four dropdown menus, such as chain of custody and audit trail 1002, signatories 1004, documents 1006, and attachments 1008. Furthermore, the GUI 1000 may include a download button 1010 that allows the user to download a local copy of the document.

FIG. 11 depicts an example of a graphical user interface for chain of custody and audit trail 1100, according to an embodiment. The GUI for chain custody and audit trail 1100 may be a dropdown menu that includes the details on each step the document was edited or modified. For example, as shown in the figure, a first user may create the document 1102. The first user may then edit the document in step 01 1104. After the first user signs the document at a timestamp 1106, the document may be completed for step 01 at that timestamp 1108. After completing the document in step 01, the server may transmit the document to a second user for further editing. The second user may receive the document and further edit the document in step 02 1110. The second user may sign the document at a timestamp 1112 after finishing editing the document. The document may be completed for step 02 at the same timestamp of the signature 1114. After completing the document in step 02, the server may then transmit the document to a third user. The third user may receive the document, edit the document, and sign the document in step 03 1116. Similarly, a fourth user may receive the document, edit the document, and sign the document in step 04 1118. After all the involved parties/users sign the document, the token generation engine of the server may generate a token 1120 based on the completed document and end the editing process.

Figure 12:
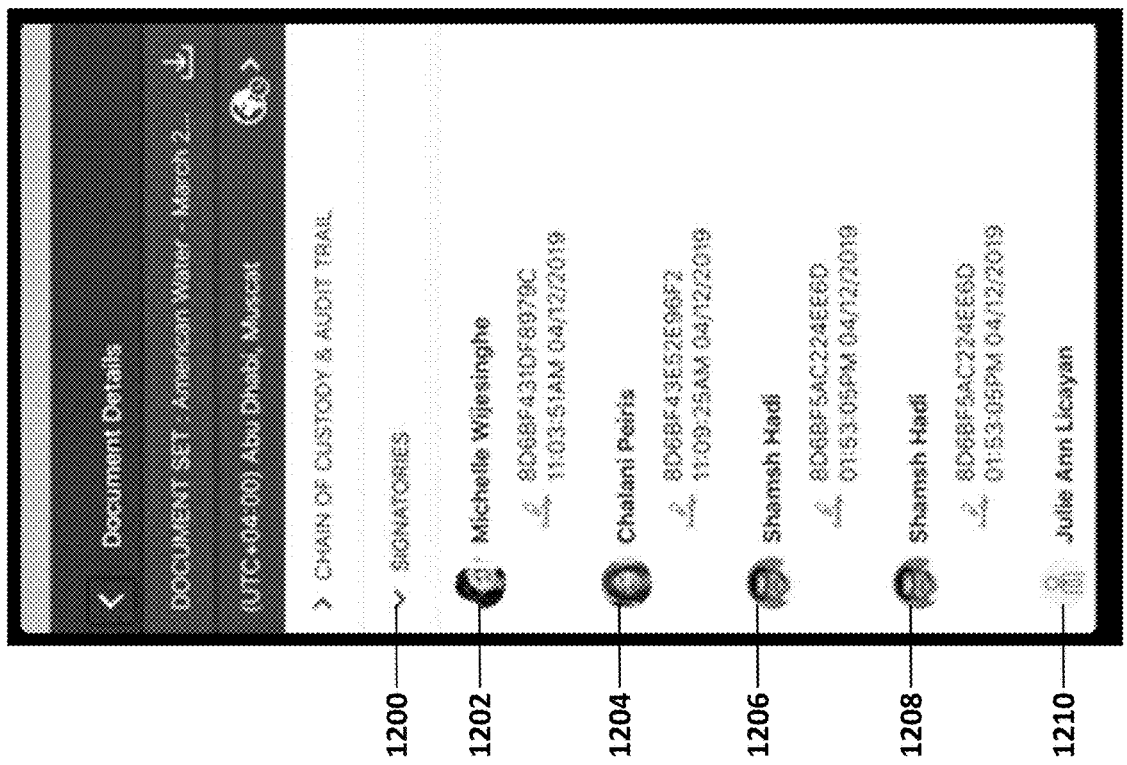
FIG. 12 depicts an example of a graphical user interface for signatories, according to an embodiment.

FIG. 12 depicts an example of a graphical user interface for signatories 1200, according to an embodiment. The GUI for signatories 1200 may be a dropdown menu that includes the details of each user's signature. For example, the signatories may show a first user's signature 1202, a second user's signature 1204, a third user's two signatures 1206, 1208, and a fourth user's signature 1210. More specifically, each signature may include the identifier of the client device and the timestamp.

Figure 13:
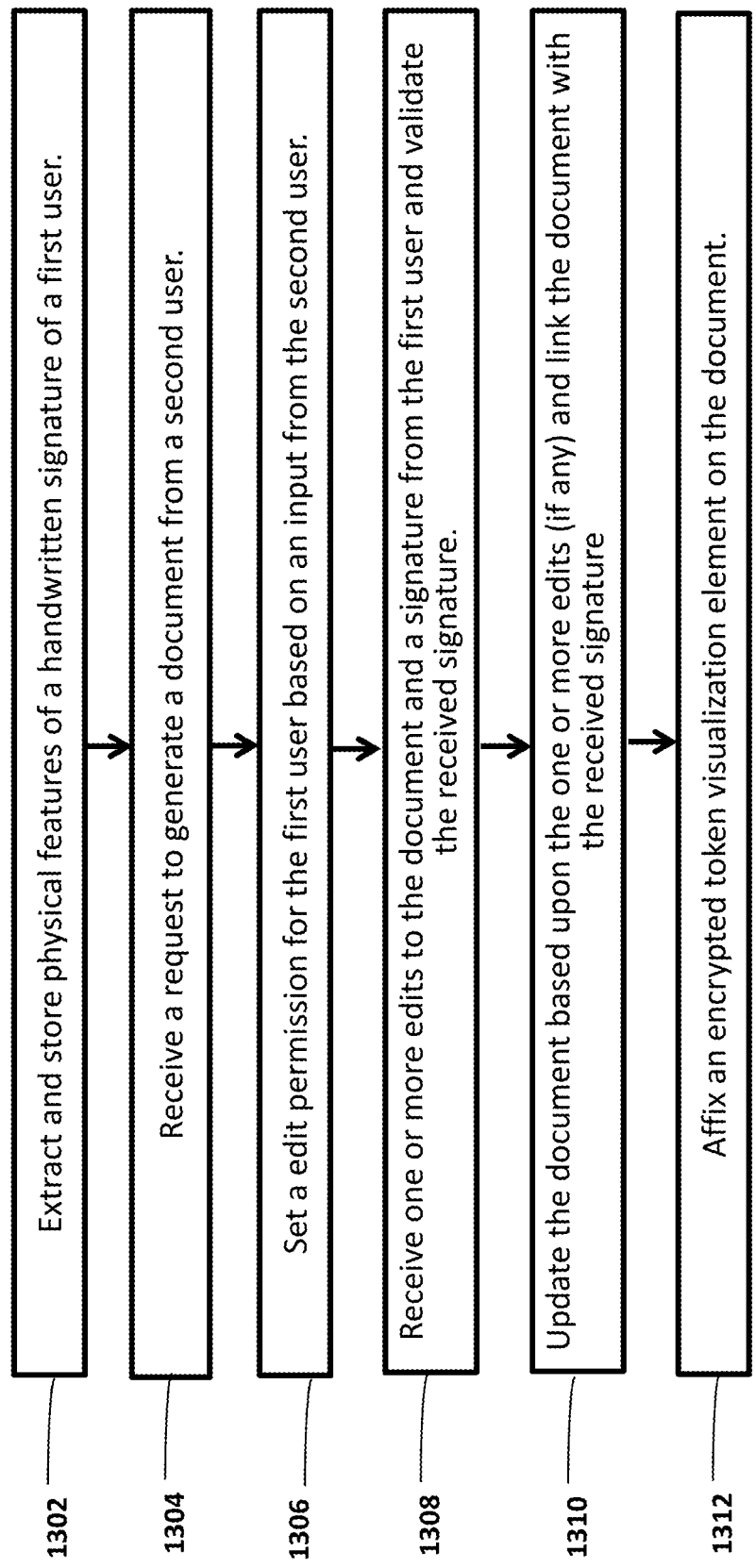
FIG. 13 depicts a flowchart for securing electronic document execution and authentication, according to an embodiment.

FIG. 13 depicts a flowchart for securing electronic document execution and authentication, according to an embodiment. Other embodiments may comprise additional or alternative steps, or may omit some steps altogether.

At step 1302, the server may extract and store physical features of a handwritten signature of a first user. The server may request users to register with the software application (e.g., web application or mobile application) provided by the server. In the registration, the server may capture each user's genuine handwritten signature. For example, the server may request each registered user to sign his/her handwritten signature on a GUI displayed on a smartphone application running on the client devices. The user may sign the handwritten signature by running his/her finger in a specific area (e.g., a signature box) included in the GUI on the touch screen of the client device.

The server may capture the handwritten signatures and extract the physical features of each signature. For example, the physical features may include which hand the user is using, the pressure points, the angle the user holds his/her finger or stylus, the speed the user signs the signature, the measurements of the curve, and the like. In addition, the physical features may include other metadata, such as a location of the client device, an identifier of the client device, and the like. The server may store each user's identifier, the captured signature and the physical features of the signature into a database. The physical features of a handwritten signature may be characteristics unique to each individual. The server may use such physical features of a handwritten signature to authenticate a user when the user signs a document.

At step 1304, the server may receive a request to generate a document from a second user. The second user may be the initial creator of a document. The document may include a plurality of fields that need to be edited and signed by multiple parties/users. The second user may also input and designate the edit permission for each user involved in the editing of the document. For example, the second user may determine that the first user has the permission to edit a first fillable textbox and sign in a first signature box. The second user may further determine that a third user has the permission to edit a second and a third fillable textboxes and sign in a second signature box.

In some embodiments, the first user and the second user are the same person. For example, a user may initiate a document, and the same user may edit and sign the document to complete the document without involving other users in the editing process.

At step 1306, the server may set an edit permission (also referred to as document permission) for the first user based on an input from the second user. As discussed above, the second user may input and designate the edit permission for each user. The server may set the edit permission for the users based on the second user's input. In operation, the server may associated the rules of the edit permission with each editable field of the document. When the server receives editing actions on one or more editable fields from a user, the server may check whether the editing actions comply with the corresponding edit permission rules of the one or more editable fields.

At step 1308, the server may receive one or more edits to the document and a signature from the first user and validate the received signature. When the server receives the one or more edits from the first user, the server may verify whether the one or more edits is within the fields that the first user has permission to edit. In implementation, the first user may need to log into his/her account to access the document and input the one or more edits to the document. Based on the first user's login information (e.g., username, password), the server may be able to determine the first user's identifier (ID). Based on the first user's ID, the server may retrieve the edit permission associated with the first user. For example, according to the edit permission, the first user may have the edit permission to edit a first fillable textbox and sign in a first signature box. The server may check whether the one or more edits from the first user is within the first fillable textbox that is designated to the first user according to the edit permission rules. The server may also check whether the signature from the first user is within the first signature box that is designated to the first user.

In some embodiments, after the server determines the first user's ID based on his/her login information, the server may only set the fields that the first user has permission to edit as editable. Any other fields that are not within the first user's edit permission may be not editable. As a result, the first user cannot input edits to any other fields in the document. In this way, the server may ensure that each user only edits the document fields that he/she has permission to edit. In some embodiments, the edit permissions (or document permissions) may be for signing the document and not for making any edits. In these embodiments, the computer may receive a signature (as detailed below) and may not receive any edits.

In addition to verifying that the first user is only editing the fields he/she has permission to edit, the server may further verify the first user's identity to make sure the first user is not some imposter. The server may further validate the received signature of the first user based on the stored physical features of the handwritten signature of the first user. The received signature may be an electronic signature based upon a second handwritten signature (e.g., a handwritten signature not used for registration/enrollment) of the first user. The server may compare the received signature with the stored handwritten signature based on the physical features of the signatures. Because the physical features of a handwritten signature are characteristics unique to each user, the handwritten signature cannot be forged. For example, if an imposter signs the document by trying to forge the first user's signature, the received signature will not match the stored handwritten signature. The physical features of the received signature (e.g., imposter's signature) may not match the physical features of the first user's signature. The server may validate the first user when the received signature matches the stored signature based on the physical features.

At step 1310, the server may update the document based upon the one or more edits (if any) and link the document with the received signature. In response to validating the received signature of the first user based on the stored physical features of the handwritten signature of the first user, the server may update the document to include the one or more edits from the first user. In some embodiments, the server upload the one or more edits to a blockchain. The server may save the new version of the document and the actions corresponding to the one or more edits to the blockchain. The server may update the blockchain periodically (e.g., every two minutes) to capture and record every edit and update within the document.

In some embodiments, there may be multiple users involved in the editing of the document. For example, after the first user signs the document, the server may transmit the updated document to a third user. The server may receive one or more edits to the document and a signature from the third user. The server may validate the received signature of the third user based on the stored physical features of the handwritten signature of the third user. In response to the received signature matches the store signature, the server may update the document based on the third user's one or more edits and upload the third user's one or more edits to the blockchain.

As a result, the blockchain may comprise a chain of custody and audit trial that includes the details on each step the document was edited or modified. For example, the blockchain may include the timestamp of each user receives the document, the user ID, the timestamp of the user's one or more edits, the contents of the one or more edits, the timestamp of the signature, the signature, the client device ID, and the like. However it should be understood that the use of the blockchain for storing the chain of custody and audit trail is merely illustrative and other forms of storage should also be considered within the scope of this disclosure.

The server may also link the received signature with the document. As described above, the received signature may be an electronic signature corresponding to a second handwritten signature. As an example, the server may overlay the received signature at the document. The overlay may be on a signature box assigned to the first user.

At step 1312, the server may affix an encrypted token visualization element on the document, the encrypted token visualization element may be configured to retrieve information associated with the one or more edits. After all the involved parties/users sign the document, the server may generate an encrypted token visualization element based on the completed document and end the editing process. The encrypted token visualization element may be a QR code or a bar code. The encrypted token visualization element may be configured to retrieve information associated with the one or more edits, including the document edit history from different users. When a user scans the encrypted token visualization element via the software application (e.g., web application or mobile application), a copy of the original document, all attachments, authentication information, security and validation information, and all other relevant information about the document and users may be available for the user to view in the chain of custody and audit trail.

In operation, the server may receive the scanning of the encrypted token visualization element from a client device. The server may download information from the blockchain that includes the document, attachments, the edit histories from different users, such as user IDs, user signatures, actions (e.g., edits) from each user, the timestamps of each edit and signature, and any other relevant information. The server may display the downloaded information on the GUI of the software application running on the client device. For example, the server may receive one or more edits from the first user. The blockchain information may include the document, the identity of the first user, the one or more edits, the signature of the first user, a timestamp associated with the one or more edits, and a timestamp associated with the signature.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
   extracting and storing, by a computer, physical features of a handwritten signature of a first user;
   receiving, by the computer, a request to generate a document from a second user;
   setting, by the computer, a document permission for the first user based on an input from the second user;
   receiving, by the computer, an electronic signature corresponding to a second handwritten signature of the first user, the electronic signature received in accordance with the document permission set by the computer;
   in response to the computer validating the electronic signature of the first user based on the stored physical features of the handwritten signature of the first user:
      linking, by the computer, the document with the electronic signature of the first user based upon the document permission; and
   affixing, by the computer, an encrypted token visualization element on the document, the encrypted token visualization element configured to indicate a link between the electronic signature of the first user and the document.

2. The computer-implemented method of claim 1, wherein the document permission includes an edit permission, the method further comprising:
   receiving, by the computer, data records indicating one or more edits to the document from a device associated with the first user; and
   in response to the computer validating the electronic signature of the first user based on the stored physical features of the handwritten signature of the first user:
      updating, by the computer, the document based upon the one or more edits, wherein the encrypted token visualization element is configured to retrieve the one or more edits.

3. The computer-implemented method of claim 2, further comprising:
   receiving, by the computer, a scanned electronic copy of the encrypted token visualization element from a client device; and
   transmitting for display, by the computer to the client device, information associated with the document on a graphical user interface of the client device.

4. The computer-implemented method of claim 3, wherein the information associated with the document comprises the document, an identity of the first user, the one or more edits, the electronic signature of the first user, a timestamp associated with the one or more edits, and a timestamp associated with the electronic signature of the first user.

5. The computer-implemented method of claim 2, further comprising:
   uploading, by the computer, the one or more edits to a blockchain.

6. The computer-implemented method of claim 1, wherein the first user and the second user are a same person.

7. The computer-implemented method of claim 1, wherein the handwritten signature is captured through a user interface displayed on a smartphone application.

8. The computer-implemented method of claim 1, further comprising:
   receiving, by the computer, one or more edits to the document and an electronic signature from a third user;
   in response to validating the received electronic signature of the third user based on stored physical features of a handwritten signature of the third user:
      updating, by the computer, the document based upon the one or more edits of the third user; and
      linking, by the computer, the electronic signature of the third user with the document.

9. The computer-implemented method of claim 1, wherein the encrypted token visualization element is a quick response (QR) code or a bar code.

10. A system comprising:
    a non-transitory storage medium storing a plurality of computer program instructions; and
    a processor electrically coupled to the non-transitory storage medium and configured to execute the computer program instructions to:
       extract and store physical features of a handwritten signature of a first user;
       receive a request to generate a document from a second user;
       set a document permission for the first user based on an input from the second user;
       receive an electronic signature corresponding to a second handwritten signature of the first user, the electronic signature received in accordance with the document permission set by the computer;
       in response to the processor validating the electronic signature of the first user based on the stored physical features of the handwritten signature of the first user:
          link the document with the electronic signature of the first user based upon the document permission; and
       affix an encrypted token visualization element on the document, the encrypted token visualization element configured to indicate a link between the electronic signature of the first user and the document.

11. The system of claim 10, wherein the document permission includes an edit permission, and wherein the processor is configured to further execute the computer program instructions to:
    receive data records indicating one or more edits to the document from a device associated with the first user; and
    in response to the processor validating the electronic signature of the first user based on the stored physical features of the handwritten signature of the first user:
       update the document based upon the one or more edits, wherein the encrypted token visualization element is configured to retrieve the one or more edits.

12. The system of claim 11, wherein the processor is configured to further execute the computer program instructions to:
  receive a scanned electronic copy of the encrypted token visualization element from a client device; and
  transmit for display to the client device, information associated with the document on a graphical user interface of the client device.

13. The system of claim 12, wherein the information associated with the document comprises the document, an identity of the first user, the one or more edits, the electronic signature of the first user, a timestamp associated with the one or more edits, and a timestamp associated with the electronic signature of the first user.

14. The system of claim 11, wherein the processor is configured to further execute the computer program instructions to:
  upload the one or more edits to a blockchain.

15. The system of claim 10, wherein the first user and second user are a same person.

16. The system of claim 10, wherein the handwritten signature is captured through a user interface displayed on a smartphone application.

17. The system of claim 10, wherein the processor is configured to further execute the computer program instructions to:
  receive one or more edits to the document and an electronic signature from a third user;
  in response to the processor validating the received electronic signature of the third user based on stored physical features of a handwritten signature of the third user:
    update the document based upon the one or more edits of the third user; and
    link the electronic signature of the third user with the document.

18. The system of claim 10, wherein the encrypted token visualization element is a quick response (QR) code or a bar code.

19. A computer-implemented method comprising:
  responsive to a computer setting one or more document permissions for a document associated with one or more users based on an input received from at least one user, validating, by the computer, an electronic signature corresponding to a handwritten signature of a user based upon stored physical features of the handwritten signature;
  affixing, by the computer, an encrypted token visualization element on the document, the encrypted token visualization element configured to indicating a link between the electronic signature of the user and the document associated with the one or more users;
  receiving, by a computer from a client device, a scanned electronic copy of the encrypted token visualization element;
  retrieving, by the computer, a plurality of data records of a sequence of events and corresponding timestamps associated with the document; and
  transmitting, by the computer to the client device, the sequence of events and corresponding timestamps configured to be displayed as a chain of custody and audit trail of the document in a graphical user interface of the client device.

20. The computer-implemented method of claim 19, wherein the sequence of events include at least one of a creation of the document, an edit to the document, a signature added to the document, an access to the document, a transmission of the document from a first user to a second user, a completion of the document.

* * * * *